(12) United States Patent
Ananth et al.

(10) Patent No.: US 12,290,711 B2
(45) Date of Patent: May 6, 2025

(54) SILOXANE-TRIAZOLEGLUCOSIDE AND GLUCOSIDE SURFACTANT FORMULATIONS FOR FIRE-FIGHTING FOAM APPLICATIONS

(71) Applicant: The Government of the United States of America, as represented by the Secretary of the Navy, Arlington, VA (US)

(72) Inventors: Ramagopal Ananth, Bryn Mawr, PA (US); Matthew Davis, Ridgecrest, CA (US); Katherine Hinnant, Washington, DC (US); Arthur W. Snow, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/806,874

(22) Filed: Aug. 16, 2024

(65) Prior Publication Data

US 2025/0073516 A1    Mar. 6, 2025

Related U.S. Application Data

(60) Provisional application No. 63/579,498, filed on Aug. 29, 2023.

(51) Int. Cl.
*A62D 1/02* (2006.01)
*A62C 5/02* (2006.01)
*C07F 7/08* (2006.01)

(52) U.S. Cl.
CPC ............ *A62D 1/0071* (2013.01); *A62C 5/022* (2013.01); *C07F 7/0889* (2013.01)

(58) Field of Classification Search
None
See application file for complete search history.

(56) References Cited

U.S. PATENT DOCUMENTS 6,680,920 B1   1/2004   Lenoir
9,446,272 B2 *  9/2016  Blunk ................. A62D 1/0071
(Continued)

OTHER PUBLICATIONS

Anath et al., "Liquid-Pool Fire Extinction Characteristics of Aqueous Foams Generated from Fluorine-free Surfactants" 36FI-0107, Spring Technical Meeting, Eastern States Section of the Combustion Institute, Mar. 4-7, 2018.
(Continued)

*Primary Examiner* — Joseph D Anthony
(74) *Attorney, Agent, or Firm* — US Naval Research Laboratory; Joseph T. Grunkemeyer

(57) ABSTRACT

The compound below may be used in a fire-fighting formulation along with a poly(glucoside)-alkane, a poly(ethylene glycol) monoalkyl ether, and water. The value n is 2 or 3, R is a C3-C9 alkylene group, X is —O— or —N(COCH$_3$)—, and c is a positive integer. It may be made by reacting a polysaccharide with acetic anhydride, propargyl alcohol, and an azidoalkyltris(trimethylsiloxy)silane or an azidoalkylbis(trimethylsiloxy)methylsilane. Alternatively, it may be made by reacting a polysaccharide with propargylamine, acetic anhydride, and an azidoalkyltris(trimethylsiloxy)silane or an azidoalkylbis(trimethylsiloxy)methylsilane.

(Continued)

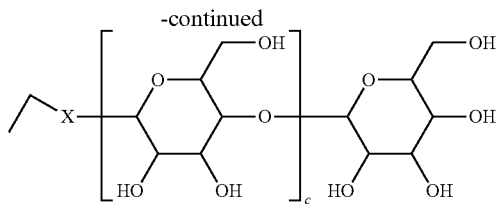

-continued

17 Claims, 17 Drawing Sheets

(56) References Cited

U.S. PATENT DOCUMENTS

| | | | |
|---|---|---|---|
| 9,687,686 | B2 | 6/2017 | Blunk et al. |
| 11,117,008 | B2 | 9/2021 | Ananth et al. |
| 11,291,875 | B2 * | 4/2022 | Ananth ............... A62C 5/02 |
| 11,420,083 | B2 * | 8/2022 | Ananth ............ A62D 1/0071 |
| 2005/0245158 | A1 | 11/2005 | Yahiaoui et al. |
| 2019/0321670 | A1 * | 10/2019 | Ananth ............... A62C 5/02 |
| 2021/0387033 | A1 * | 12/2021 | Ananth ............ A62D 1/0071 |

OTHER PUBLICATIONS

Conroy et al., "Surface Cooling of a Pool Fire by Aqueous Foams" Combustion Science and Technology 2017, vol. 189, No. 5, 806-840.

Hinnant et al., "Evaluating Foam Degradation and Fuel Transport Rates through Novel Surfactant Firefighting Foams for the Purpose of AFFF Perfluorocarbon Replacement" Spring Technical Meeting, Eastern States Section of the Combustion Institute, Mar. 4-7, 2018.

Hinnant et al., "Influence of fuel on foam degradation for fluorinated and fluorine-free foams" Colloids and Surfaces A: Physicochem. Eng. Aspects 522 (2017) 1-17.

Hinnant et al., "Simultaneous measurement of fuel transport and foam degradation for firefighting foams to improve understanding of fire suppressing mechanisms" 11th U. S. National Combustion Meeting Organized by the Western States Section of the Combustion Institute Mar. 24-27, 2019.

Hinnant et al., "Measuring fuel transport through fluorocarbon and fluorine-free firefighting foams" Fire Safety Journal 91 (2017) 653-661.

Hinnant et al., "An Analytically Defined Fire-Suppressing Foam Formulation for Evaluation of Fluorosurfactant Replacement" J. Surfact. Deterg. (2018).

* cited by examiner

SILOXANE-TRIAZOLEGLUCOSIDE AND GLUCOSIDE SURFACTANT FORMULATIONS FOR FIRE-FIGHTING FOAM APPLICATIONS

REFERENCE TO RELATED APPLICATIONS

This application claims the benefit of U.S. Provisional Application No. 63/579,498, filed on Aug. 29, 2023. The provisional application and all other publications and patent documents referred to throughout this nonprovisional application are incorporated herein by reference.

TECHNICAL FIELD

The present disclosure is generally related to fire-fighting compositions.

DESCRIPTION OF THE RELATED ART

Prior to the 1960s, foams based on proteinaceous waste products were used to extinguish hydrocarbon fuel fires [A. F. Ratzer, "History and Development of Foam as a Fire Extinguishing Medium", Ind. Eng. Chem. 48, 2013, 1956]. In the 1960s fluorocarbon surfactants were introduced to fire-fighting foam formulations and largely displaced the slow acting protein foams [Tuve R. L. and Jablonski, E. J., "Compositions and Methods for Fire Extinguishment and Prevention of Flammable Vapor Release", U.S. Pat. No. 3,258,423, 1966; Tuve, R. L., Peterson, H. B., Jablonski, E. J., and Neill, R. R., "A New Vapor-Securing Agent for Flammable-Liquid Fire Extinguishment", Naval Research Laboratory Report 6057, DTIC Document No. ADA07449038, Washington DC, 1964]. It was proposed that the fluorocarbon surfactants form an aqueous film under the foam layer that seals off fuel vapors emerging from the pool surface. The aqueous film was attributed to spread on the pool surface because of fluorocarbon surfactants reduce the surface tension to an extremely low value (<17 dynes/cm). The foam layer's role was thought to protect the aqueous film from heat and was a water delivery mechanism to the aqueous film. The aqueous film was considered to be responsible for the high fire suppression performance of AFFF. AFFF formulations over time have evolved into complex recipes with many ingredients to serve multiple purposes. Many commercial AFFF formulations are understandably complex and proprietary. Hydrocarbon surfactants were added to the fluorocarbon surfactants for dynamic surface tension to reach its equilibrium value more quickly to accelerate spreading of the aqueous film. Other components in addition to water include: organic solvents (viscosity control, storage stabilization at subzero or elevated temperatures); polymers (precipitated barrier formation on polar/alcohol fuels); salts (surfactant shielding); chelating agents (polyvalent ions sequestering); buffers; corrosion inhibitors; and biocides [T. J. Martin, "Fire-Fighting Foam Technology," in *Foam Engineering: Fundamentals and Applications*; P. Stevenson, Ed.; Ch. 17, Wiley-Blackwell, West Sussex, UK, 2012]. The patent by Norman and Regina discloses some particularly informative recipe examples [E. C. Norman, A. C. Regina, U.S. Pat. No. 5,207,932]. Since their introduction, AFFFs have been used by civilian and military organizations worldwide including most airports internationally and are considered the equivalent of a gold standard in pool firefighting because of their high fire suppression performance, which is defined more generally as the ability to extinguish completely a given fire quickly using minimal amount of solution. The fire performance is defined more specifically by U.S. MilSpec [Mil-F-24385F], which is used to certify the performance of AFFFs for use in DOD firefighting applications and probably the most stringent compared to other standards of performance (e.g., International Civil Aviation Organization—ICAO, Underwriters Laboratories Inc.—UL) used in civilian applications. One of the test performed under U.S. MilSpec is a fire extinction test that specifies that a 6-ft diameter gasoline pool fire be extinguished in less than 30 s using less than 1 U.S. gallon of solution.

While fluorocarbon-containing AFFF formulations have been highly effective, the fluorocarbon surfactants contained in AFFF are found to pose serious environmental and health hazards [C. A. Moody, J. A. Field, "Perfluorinated Surfactants and Environmental Implications of their Use in Firefighting Foams", *Environ. Sci. Tech.*, 34, 3864, 2000]. Elimination or replacement of the fluorocarbon surfactant component in the AFFF formulation is an important and imperative research objective; legal authorities such as U.S. EPA and equivalent European government agencies have been restricting the use of fluorocarbons in firefighting foams either on a voluntary basis or by law, and may in the future require a total discontinuation [S. Zhang, D. N. Lerner, "Review of Physical and Chemical Properties of Perfluoro Octenyl Sulphonate (PFOS) with Respect to its Potential Contamination on the Environment", *Adv. Mater. Res.*, 518, 2183, 2012]. In addition to the environmental and health hazards, there has always been an economic driver in place for many years as the cost of the fluorocarbon surfactants "represents 40-80% of the cost of the concentrate" [U.S. Pat. No. 5,207,932].

Fluorine-free surfactant formulations may significantly reduce the environmental and health impact as they do not contain one of the most stable bonds between carbon and fluorine in organic chemistry. However, the problem is that it is extremely difficult to achieve aqueous film formation without the fluorine due to the inability to achieve extremely low surface tension (<17 dynes/cm). After decades of research, the firefighting community has not been able to find fluorine-free surfactants that reduce the surface tension to extremely low values. In 2016, a fluorine-free fire suppressing formulation containing a surfactant composed of a glucoside head group bonded to a siloxane tail group was custom synthesized [D. Blunk, R. H. Hetzer, A. Sager-Wiedmann, K. Wirz, U.S. Pat. No. 9,446,272 Sep. 20, 2016 and 9,687,686, Jun. 27, 2017]. A formulation containing the custom synthesized trisiloxane with a glucoside head group, a hydrocarbon surfactant (Glucopon 215 UP, BASF Inc.), and a solvent (Di-glycol butyl ether, DGBE) was able to lower the surface tension to 20 dynes/cm to achieve the aqueous film formation marginally on a limited number of fuels (Kerosene and jet fuel) having relatively high surface tension. The siloxane formulation was unable to form an aqueous film on n-heptane or gasoline fuel, which is employed in U.S. MilSpec tests [Mil-F-24385F]. Furthermore, the siloxane surfactant was a prepared by a multistep synthesis with relatively low yield, which is of questionable practicality for large scale synthesis. Blunk et al. also considered four, non-glucoside, trisiloxane surfactants as counter-examples for comparison that did not form the aqueous film. They were tri-siloxanes with oxyethylene head group (4, 6, and 12 unit lengths) terminated with hydroxyl similar to the commercial tri-siloxane surfactant component described previously (US Patent Application Publication No. US2019/0321670 A1, Pub. Date Oct. 24, 2019 and Colloids and Surfaces A, 579, 123686, 2019). However, Blunk et al. rejected the trisiloxanes with oxyethylene head group for fire suppression on the basis that the siloxanes did not form the aqueous film. In summary, no fluorine-free replacement surfactants have been found with film formation ability comparable to that of AFFF on low surface tension fuels such as gasoline.

To compensate for the loss of the aqueous film, the foam industry (e.g., RF6, Solberg, Inc. product and Angus 3%, National Foam, Inc. product) developed fluorine-free foams that reduce drainage and hold more water in the foam layer. The increased liquid content in the foams was achieved by using hydrocarbon surfactants and viscosity modifying additives to control liquid loss by drainage from the foams. However, these approaches to replacing the fluorocarbon surfactants sacrifice AFFF's high fire suppression performance because of the use of less fuel resistant hydrocarbon surfactants and excess solution for comparable fire extinction time. Because only a limited amount of the solution can be carried to the fire site, the commercial fluorine-free foams will not be able to put out large fires as quickly as AFFF on a per unit mass of liquid basis. As a result, the fluorine-free formulations are not expected or claimed to have passed the more stringent U.S. MilSpec [Mil-F-24385F] for gasoline fires by the manufacturers. However, some of the commercial fluorine-free foams have been qualified by European standards (ICAO) for civilian firefighting applications.

In summary, all surfactant AFFF formulations to date that meet the Military Specification (MilSpec) requirements for fire extinguishing [Mil-F-24385F] contain fluorocarbon surfactants. Fluorine-free firefighting foam formulations do exist but to date have not met the MilSpec requirements especially for gasoline fires.

Fuel vapor resistance property of surfactants is important for fire suppression efficiency rather than a liquid layer either in the form of aqueous film formation or high liquid content of foams ["Measuring Fuel Transport through Fluorocarbon and Fluorine-free Firefighting Foams", Fire Safety Journal, 91, 653-661, 2017 and "Influence of Fuel on Foam Degradation for Fluorinated and Fluorine-free Foams", Colloids and Surfaces A, 522, 1-17, 2017]. A siloxane formulation containing 0.2 weight % commercial non-ionic siloxane surfactant (Dowsil 502W additive, Dow Silicones Co., Midland, MI), 0.3 weight % Glucopon225DK (BASF Inc.), and 0.5 weight % diethyleneglycol butylether (DGBE, Dow Chemical Co.) in deionized water generates a foam that suppresses heptane pool fires at bench and large scales (US Patent Application Publication No. US2019/0321670 A1, Pub. Date Oct. 24, 2019 and Colloids and Surfaces A, 579, 123686, 2019). A 3% concentrate of this formulation has low viscosity unlike most of commercial fluorine-free formulations available on the market. The high viscosity of the commercial fluorine-free formulations prevents them from being qualified for US DOD use as depicted in MIL-PRF-24385 as drop-in replacements for AFFF. However, the non-ionic siloxane formulation's fire suppression was found to be poor on gasoline fires at bench and large scales (NRL Memorandum Report NRL/MR/6180-20-10,145). This appears to be due to siloxane surfactant extraction by gasoline (NRL Memorandum Report NRL/MR/6180-20-10, 145). To address the gasoline issue, a new zwitterionic-siloxane formulation was developed (US Patent Publication No. US2022/11420083 B2), which is effective in suppressing gasoline (alcohol-free) fires with 60% fire suppression effectiveness of Reference AFFF, which was described previously (Journal of Surfactants and Detergents, 21, 711-722, 2018), based on benchtop measurements. The zwitterionic-siloxane formulation is also much more effective in suppressing gasoline fires than the non-ionic siloxane formulation and was described previously (US Patent Application Publication No. US2019/0321670 A1, Pub. date Oct. 24, 2019).

SUMMARY OF THE INVENTION

Disclosed herein is compound 1. The value n is 2 or 3, R is a C3-C9 alkylene group, X is —O— or —N(COCH$_3$)—, and c is a positive integer.

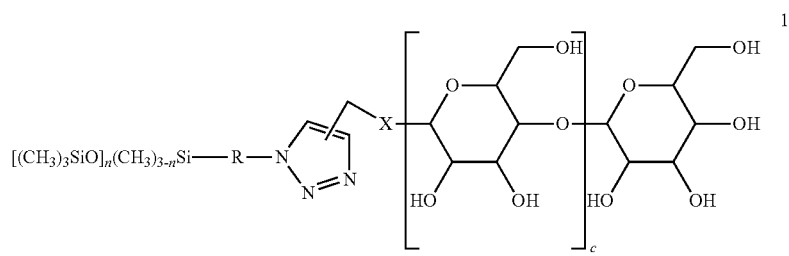

Also disclosed herein is a method comprising: providing a polysaccharide 2, reacting the polysaccharide 2 with acetic anhydride to form acetate groups, forming a polysaccharide acetate 3, reacting the polysaccharide acetate 3 with propargyl alcohol to form a propargyl compound 4, and reacting the propargyl compound 4 with an azidoalkyltris(trimethylsiloxy)silane or an azidoalkylbis(trimethylsiloxy)methylsilane to form compound 5. The value n, R, and c are as defined above.

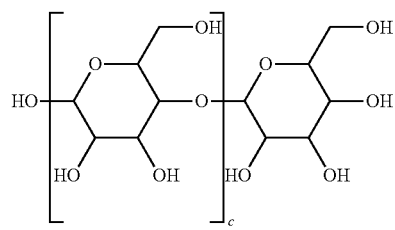

2

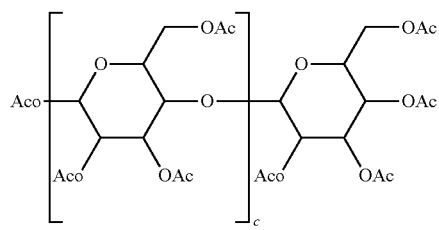

3

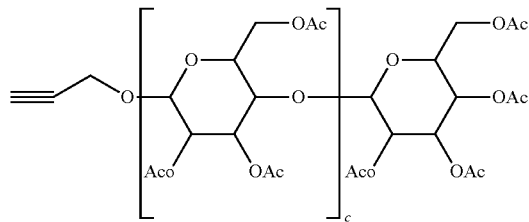

4

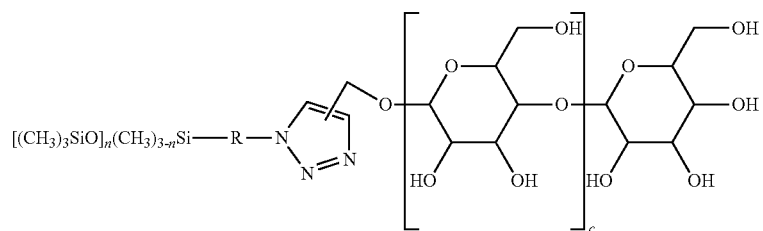

5

Also disclosed herein is a method comprising: providing a polysaccharide 2, reacting the polysaccharide 2 with propargylamine to form a propargyl compound 6, reacting the propargyl compound 6 with acetic anhydride to form acetate groups, forming a polysaccharide acetate 7, and reacting the polysaccharide acetate 7 with an azidoalkyltris(trimethylsiloxy)silane or an azidoalkylbis(trimethylsiloxy)methylsilane to form compound 8. The value n, R, and c are as defined above.

BRIEF DESCRIPTION OF DRAWINGS

A more complete appreciation will be readily obtained by reference to the following Description of the Example Embodiments and the accompanying drawings.

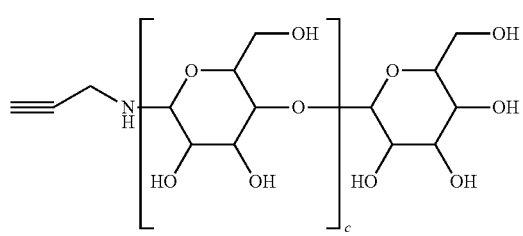

6

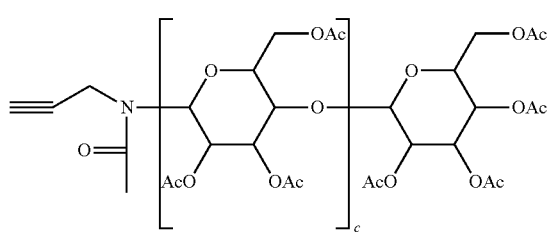

7

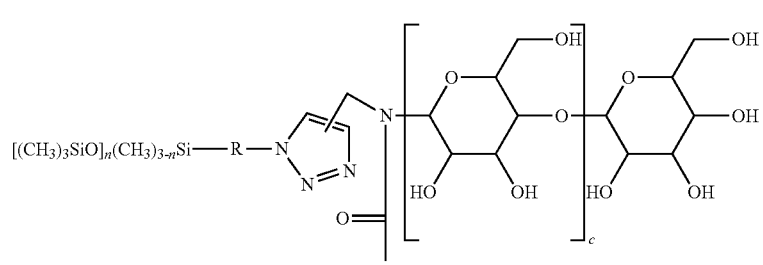

8

Figure 3:
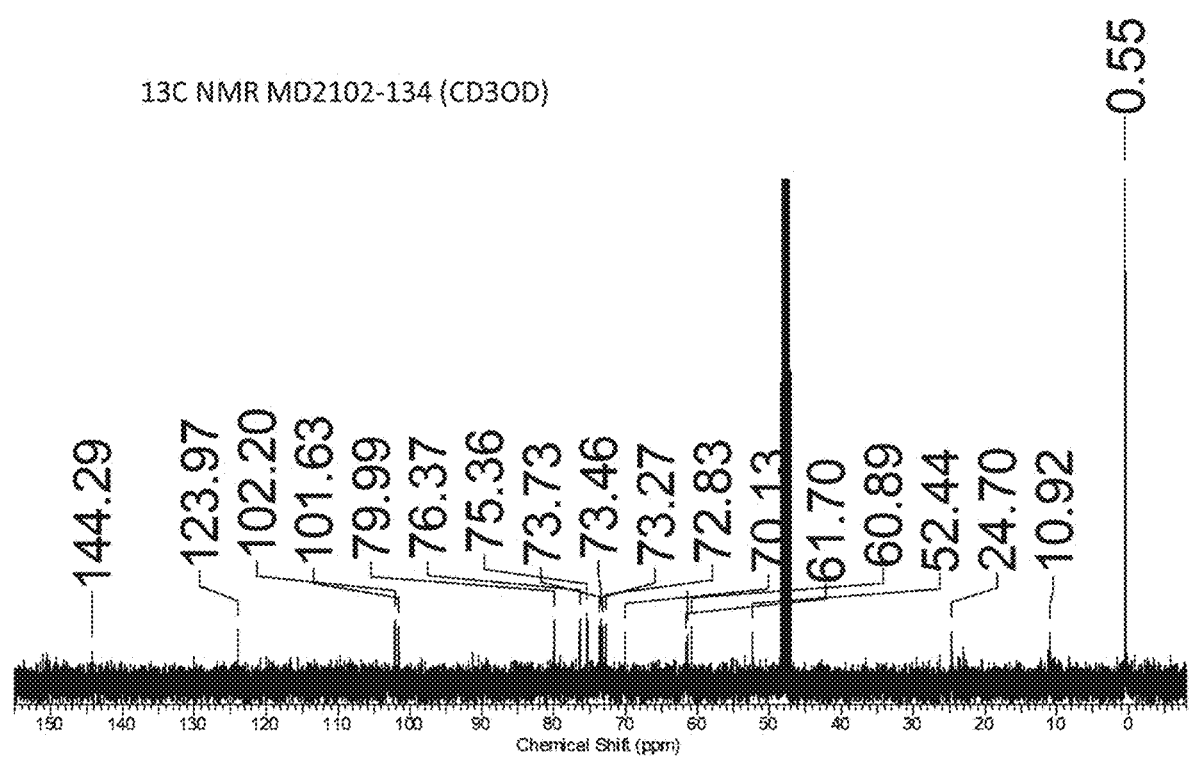

FIG. 3 shows $C^{13}$ NMR spectra for tetrasiloxane-triazolediglucoside.

Figure 4:
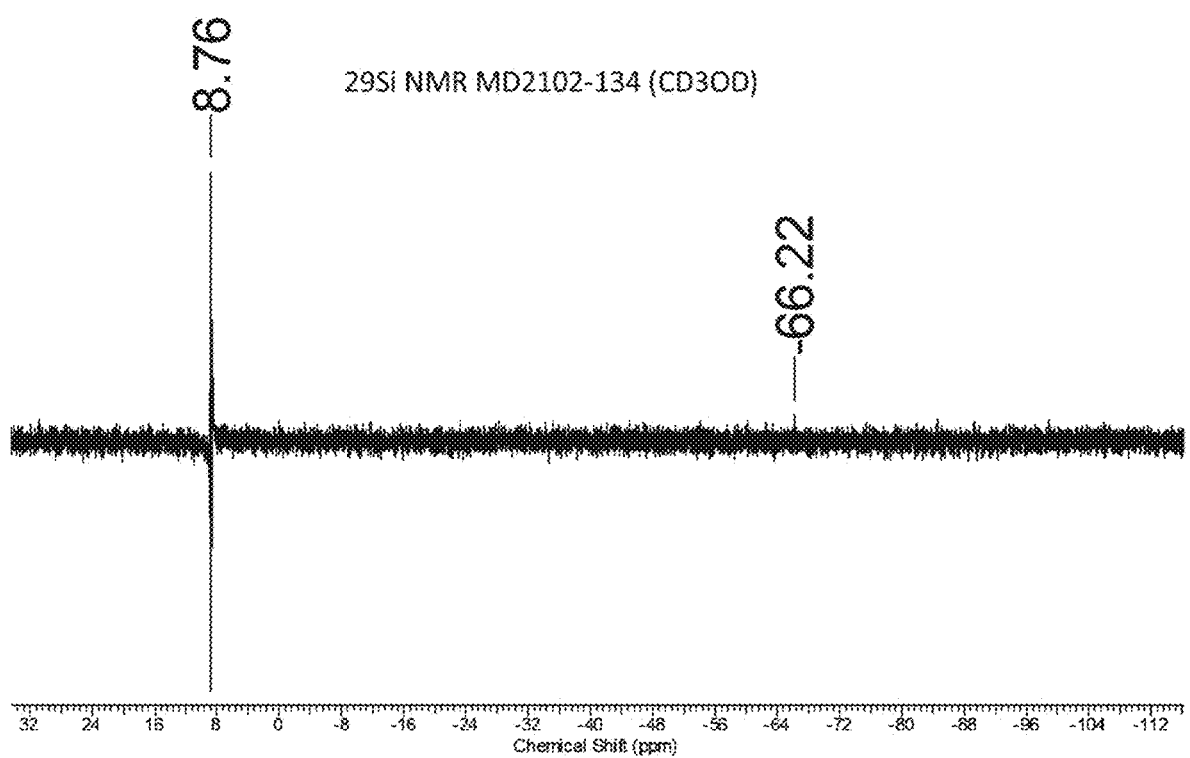

FIG. 4 shows $Si^{29}$ NMR spectra for tetrasiloxane-triazolediglucoside.

Figure 5:
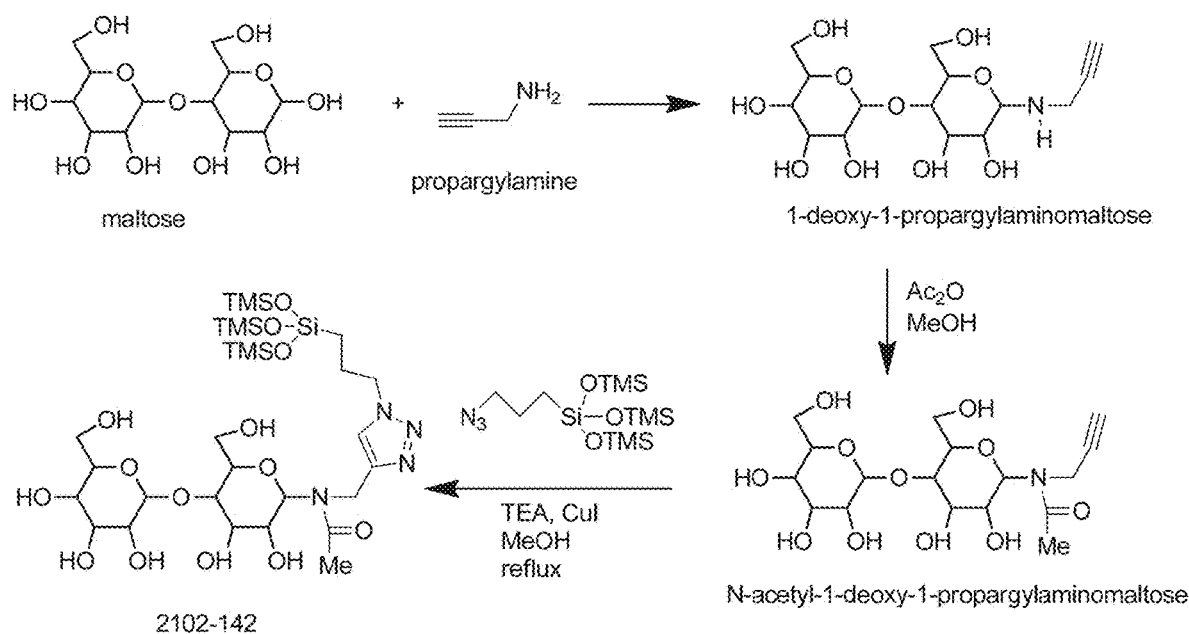

FIG. 5 shows a chemical synthesis of tetrasiloxane-triazolecarbonyldiglucoside surfactant (MD2102-142).

Figure 6:
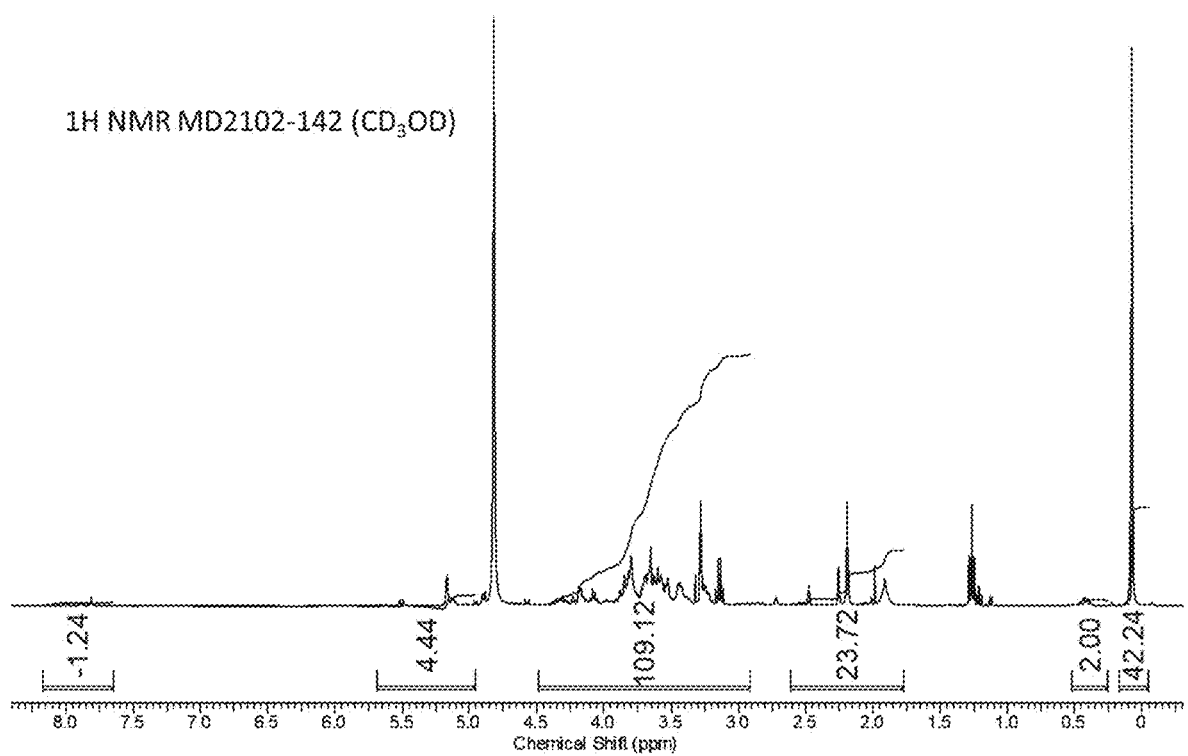

FIG. 6 shows $H^1$ NMR spectra for tetrasiloxane-triazolecarbonyldiglucoside.

Figure 7:
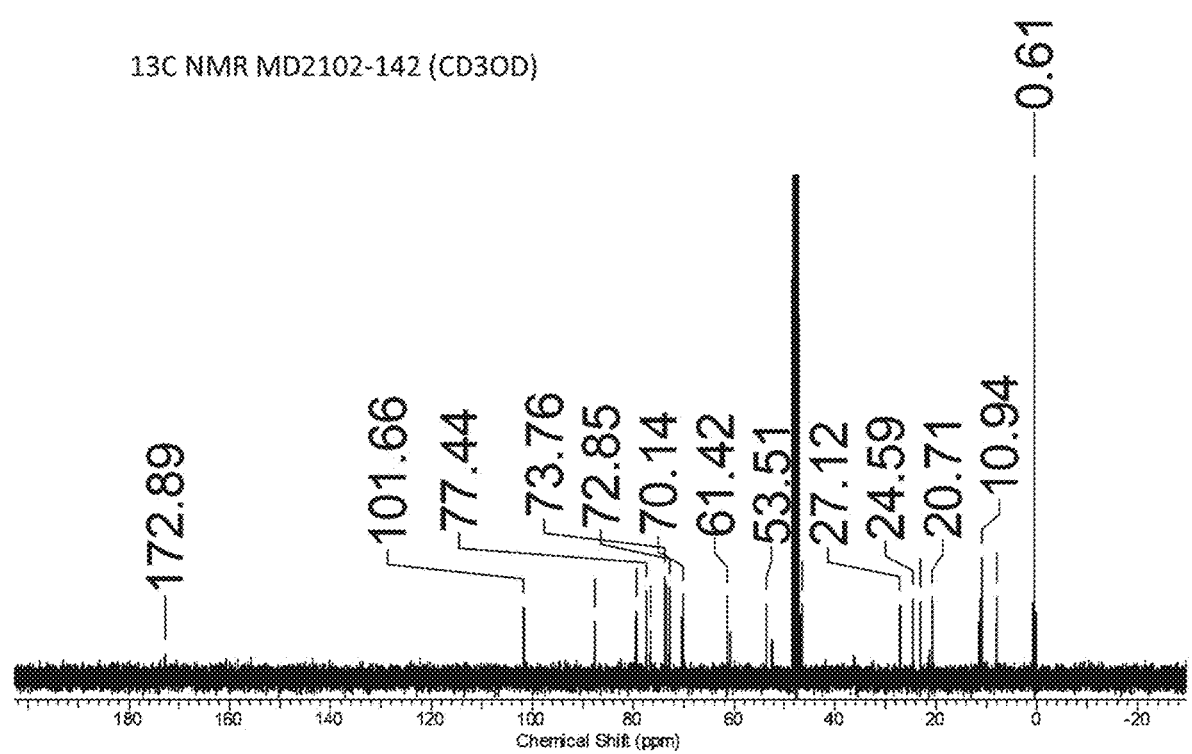

FIG. 7 shows $C^{13}$ NMR spectra for tetrasiloxane-triazolecarbonyldiglucoside.

Figure 8:
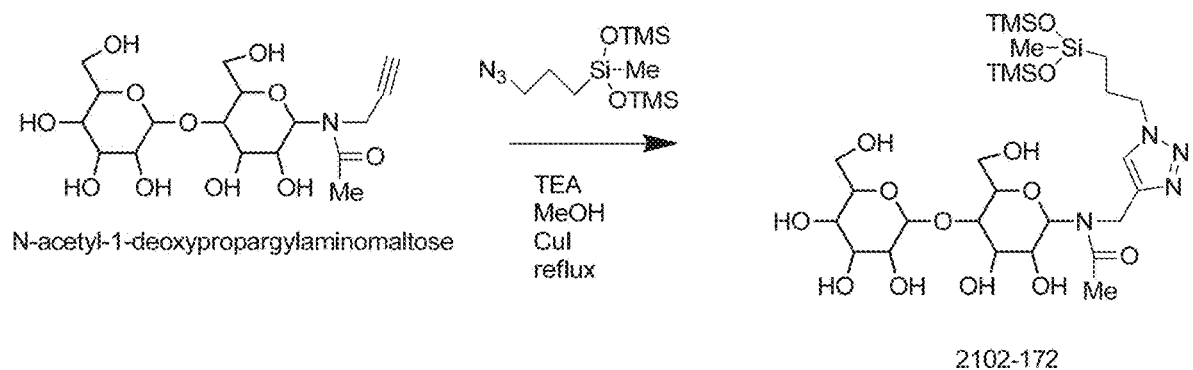

FIG. 8 shows a chemical synthesis of trisiloxane-triazolecarbonyldiglucoside surfactant (MD2102-172).

Figure 9:
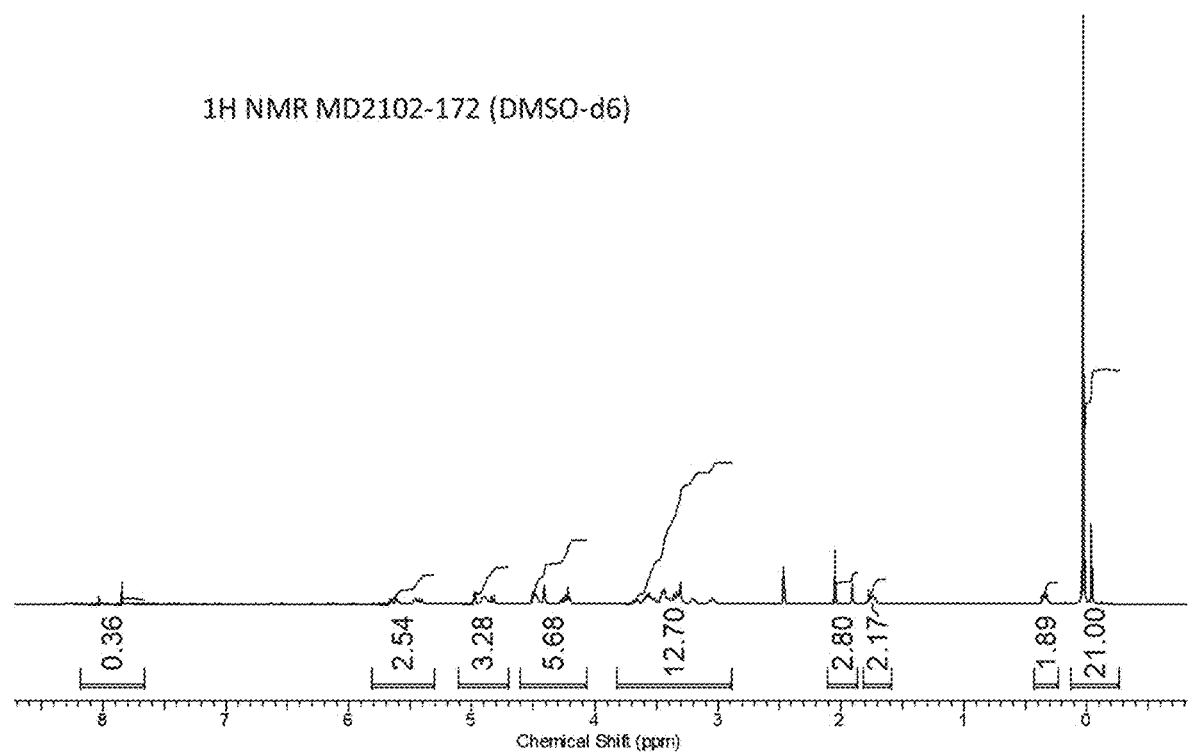

FIG. 9 shows $H^1$ NMR spectra for trisiloxane-triazolecarbonyldiglucoside.

Figure 10:
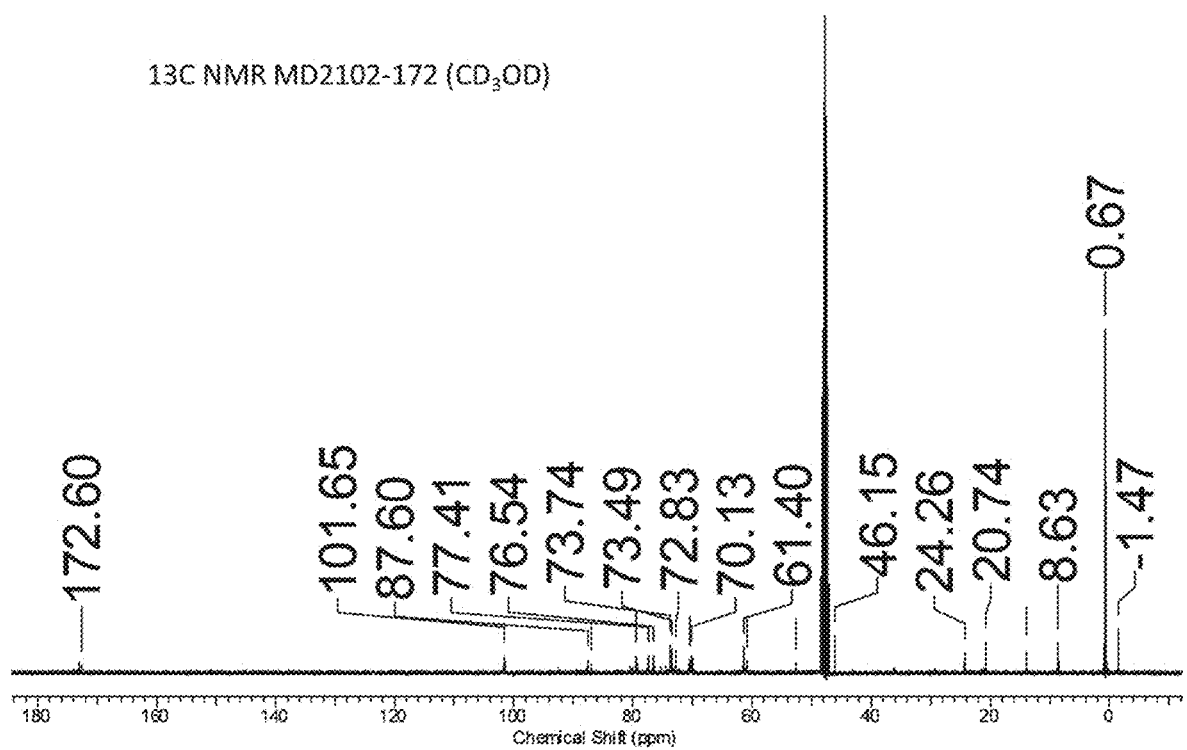

FIG. 10 shows $C^{13}$ NMR spectra for trisiloxane-triazolecarbonyldiglucoside.

Figure 11:
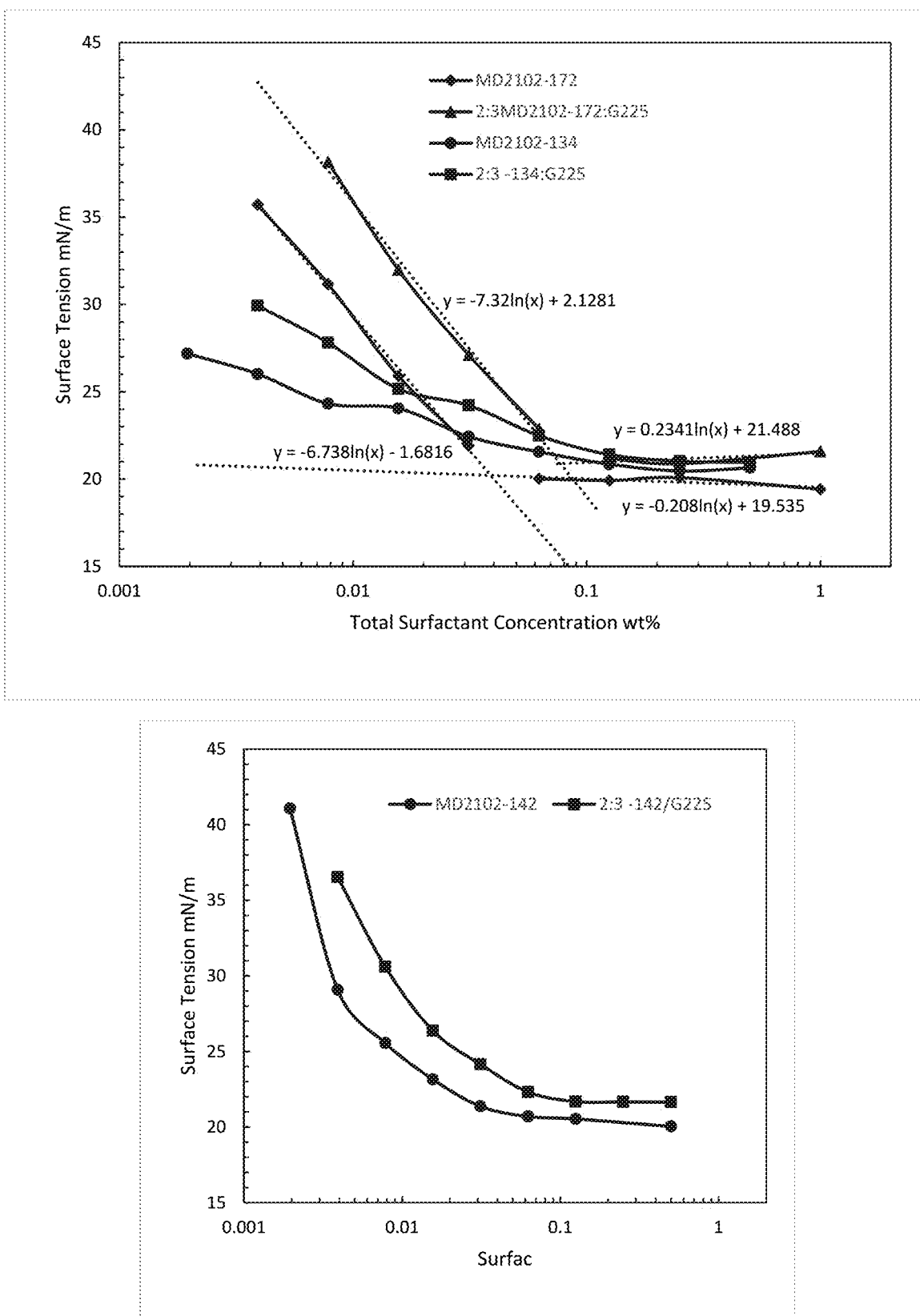

FIG. 11 shows surface tension versus total surfactant (siloxane-triazoleglucoside+alkylpolyglucoside) concentration with fitted lines to determine CMC values.

Figure 12:
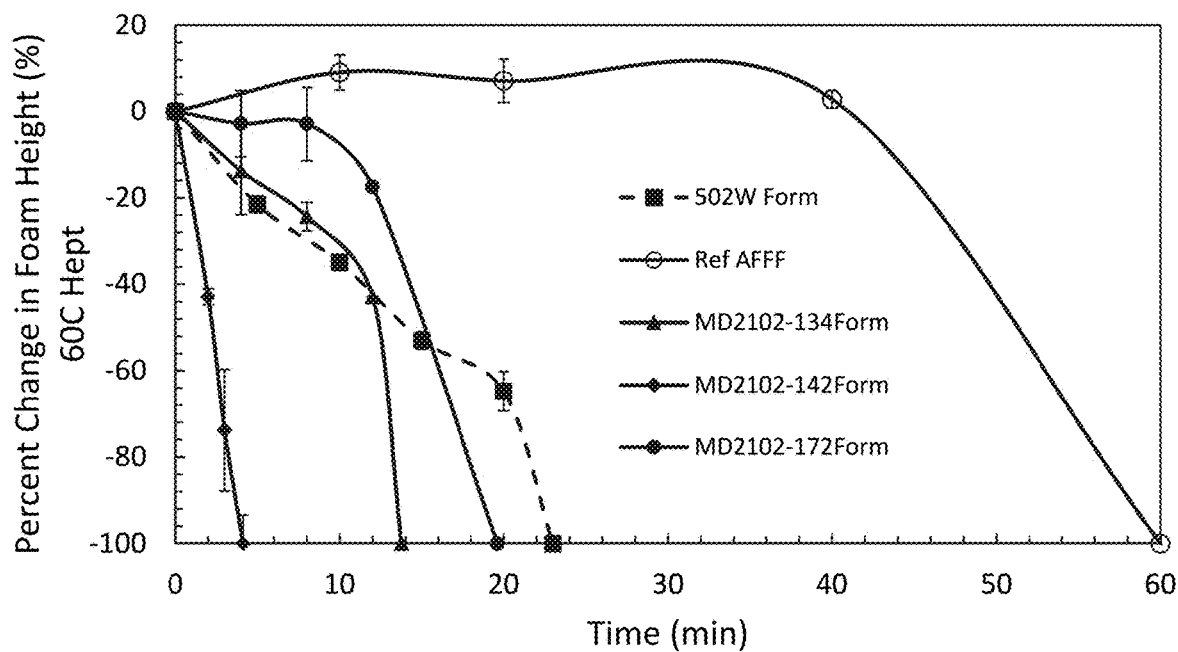

FIG. 12 shows change in foam layer thickness (initial thickness 4 cm) with time when placed on a hot heptane pool due to fuel induced foam degradation.

Figure 13:
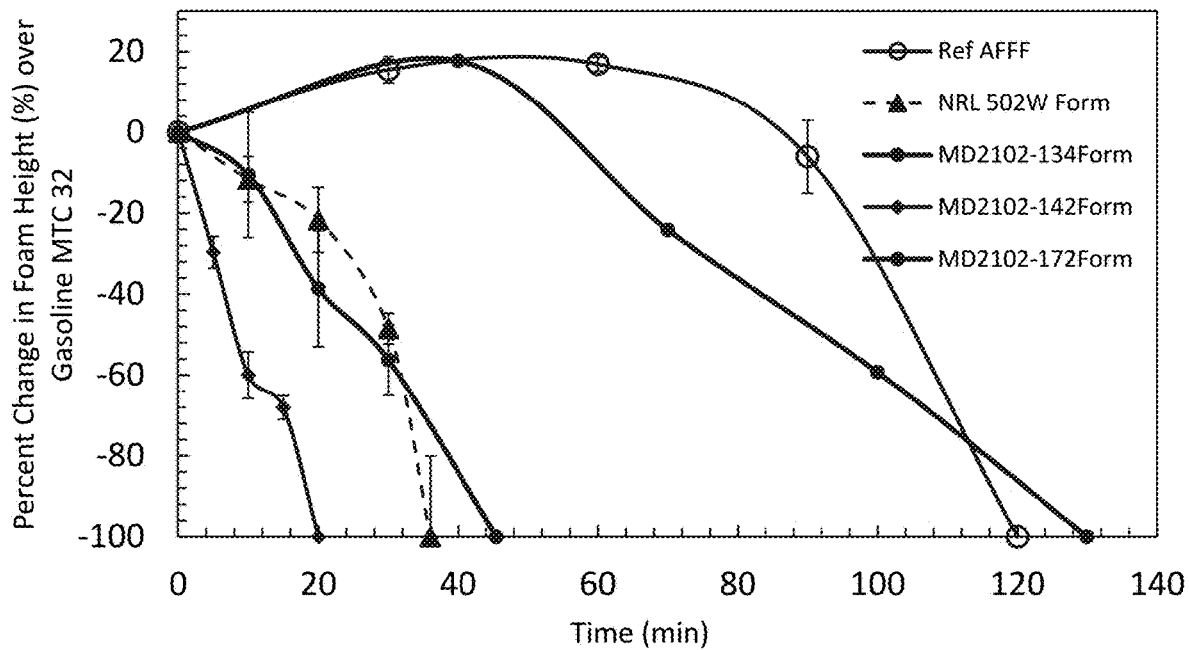

FIG. 13 shows change in foam layer thickness (initial thickness 4 cm) with time when placed on a hot heptane pool due to fuel induced foam degradation.

Figure 14:
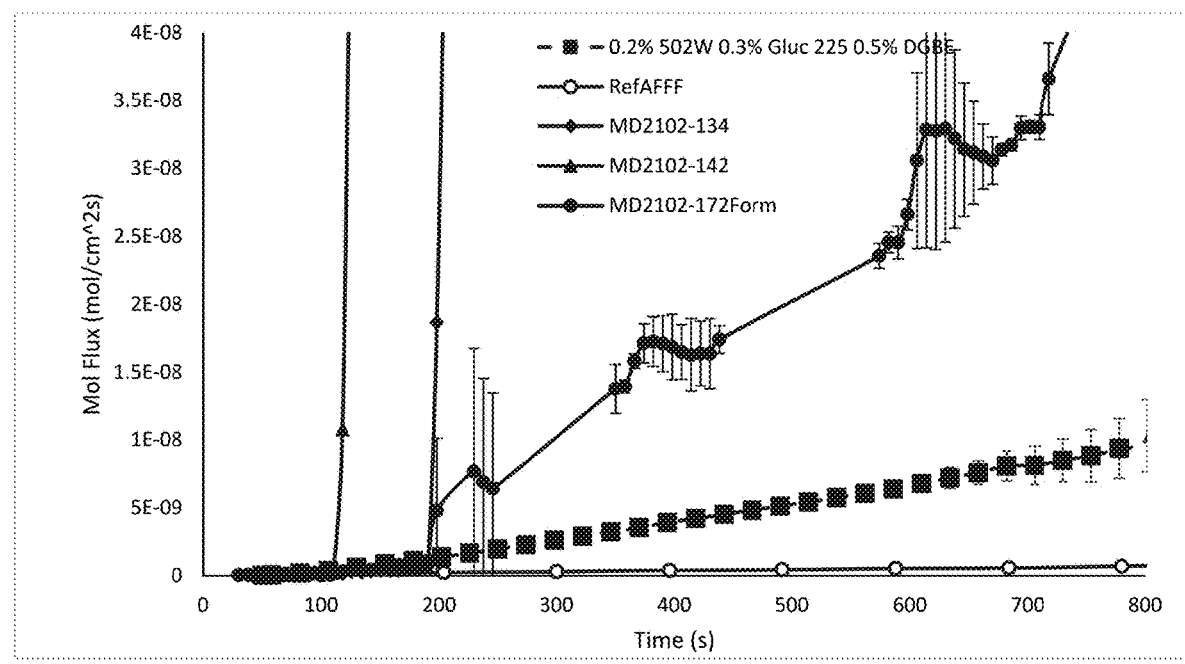

FIG. 14 shows heptane vapor permeation through a foam layer (4-cm initial thickness) placed on hot (60° C.) heptane pool with time.

Figure 15A:
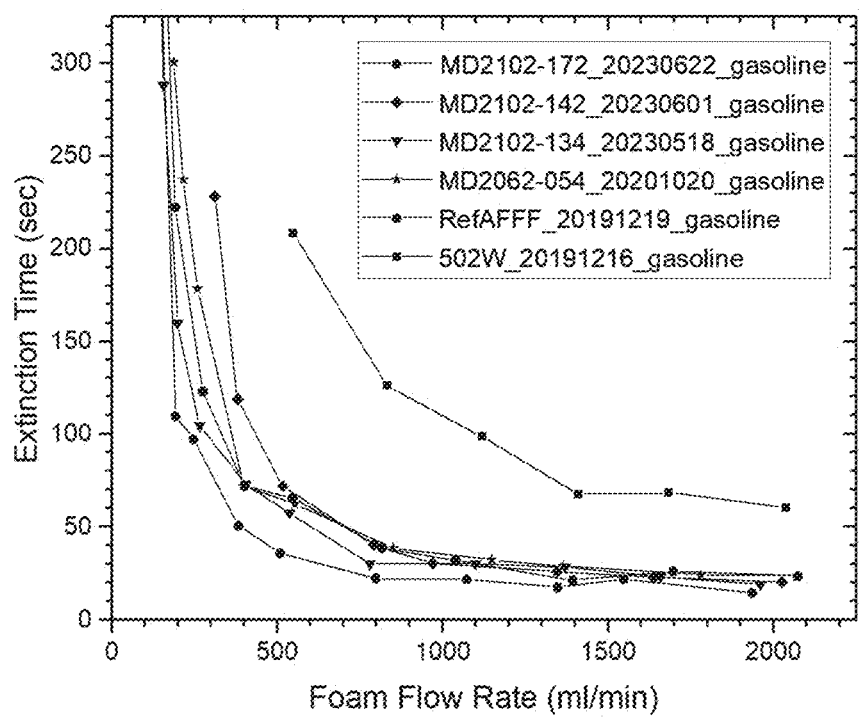
Figure 15B:
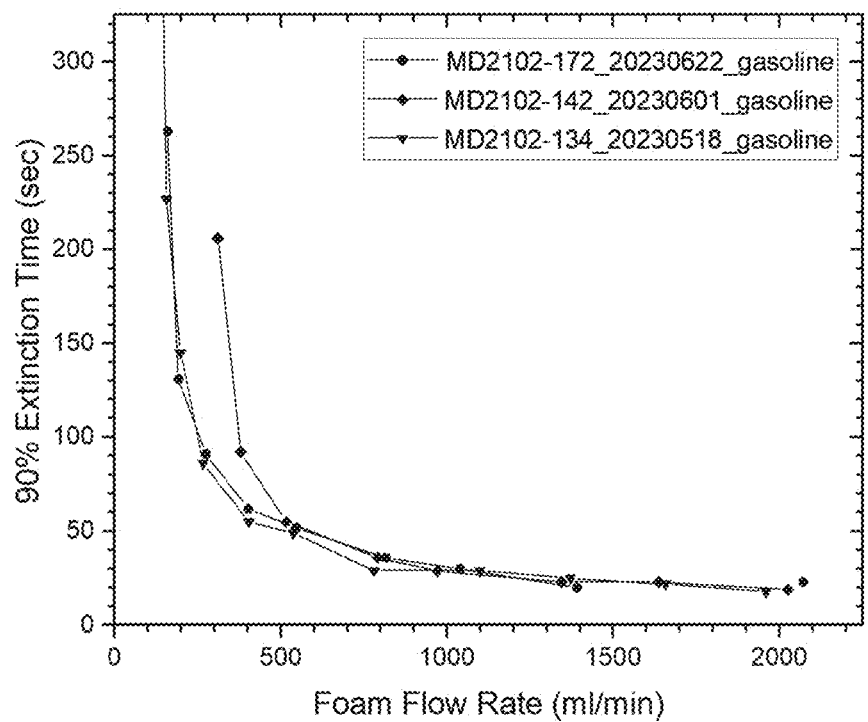

FIGS. 15A-B show gasoline fire extinction times versus foam application rate onto the edge of a 19-cm diameter gasoline pool fire for the 3-component siloxane-triazoleglucoside formulations (inverted triangles, diamonds, and squares), zwitterionic siloxane formulation (stars), RefAFFF (circles), and non-ionic siloxane-polyoxyethylene (502W-Glucopon225DK, squares) surfactant formulation with compositions shown in Table 1. FIG. 15A shows time for complete fire extinction and FIG. 15B shows time for extinction of 90% of the pool surface.

Figure 16A:
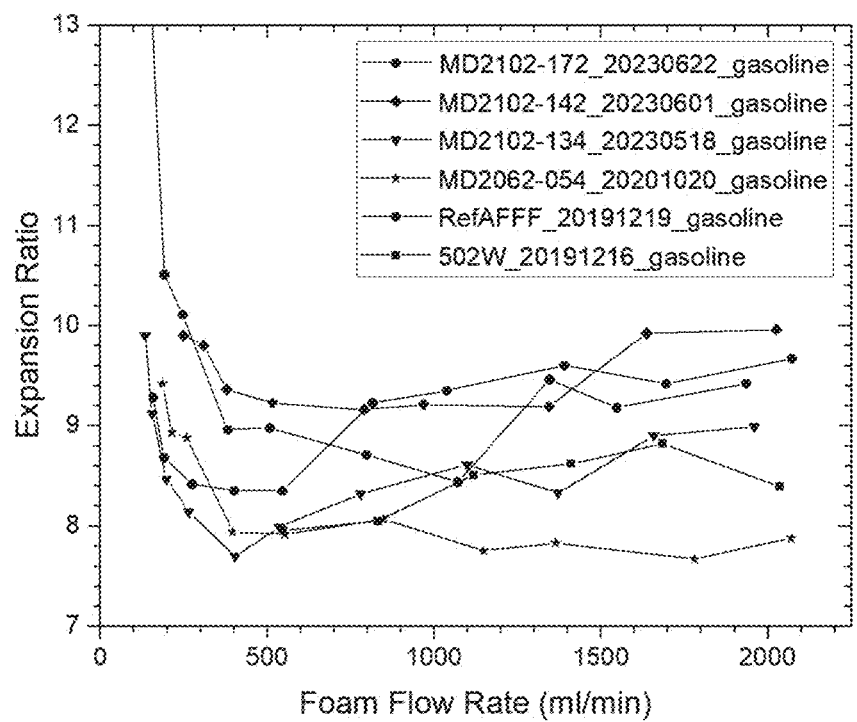
Figure 16B:
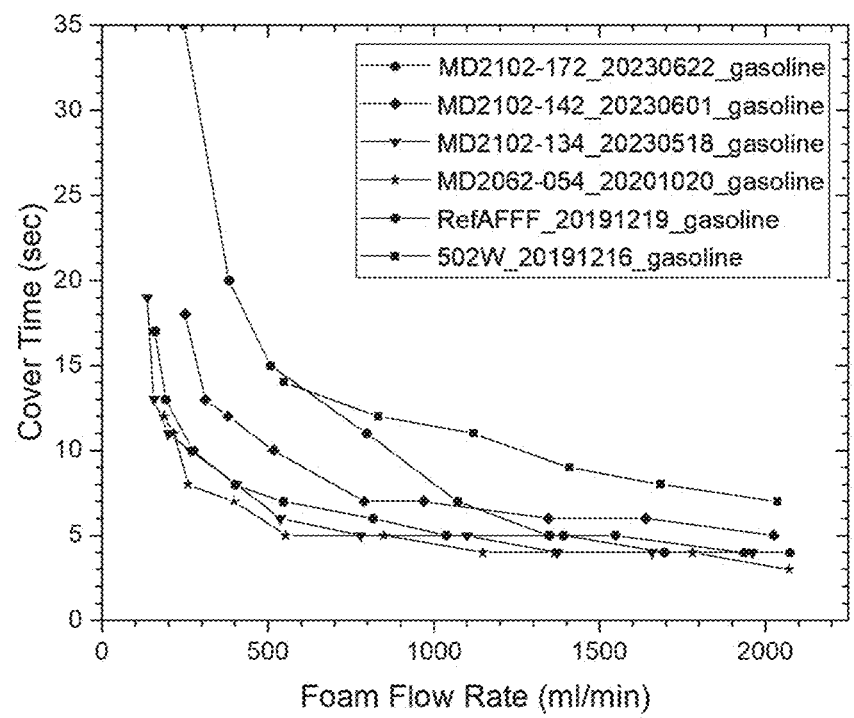

FIGS. 16A-B show gasoline fire performances. FIG. 16A shows pool coverage time versus foam application rate onto the edge of a 19-cm diameter gasoline pool fire for the siloxane-triazoleglucoside formulations, zwitterionic siloxane formulation, RefAFFF, and non-ionic siloxane-polyoxyethylene (502W-Glucopon225DK, triangles) surfactant formulation with compositions shown in Table 1. FIG. 16B shows expansion ratio versus foam flow rates.

Figure 17A:
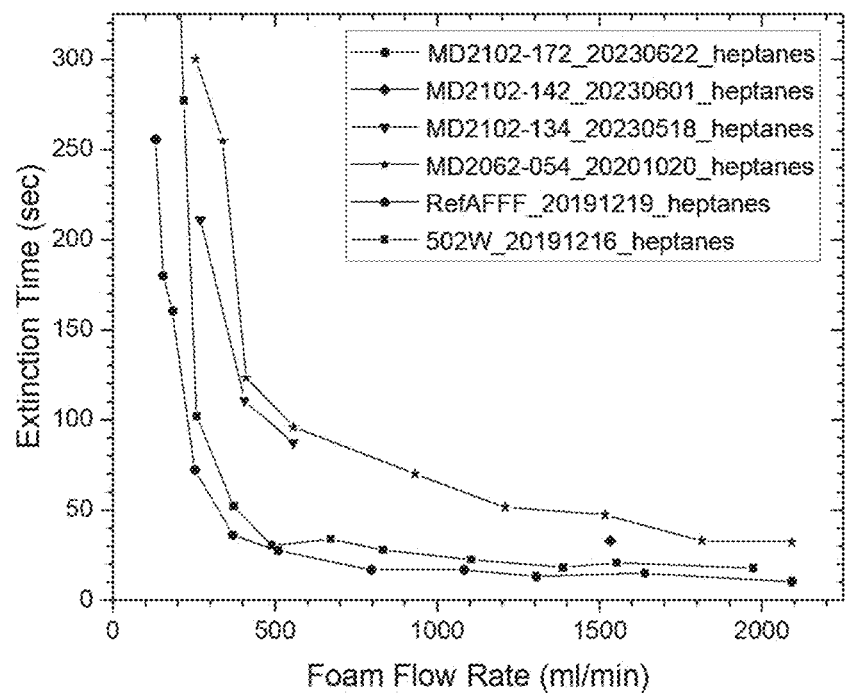
Figure 17B:
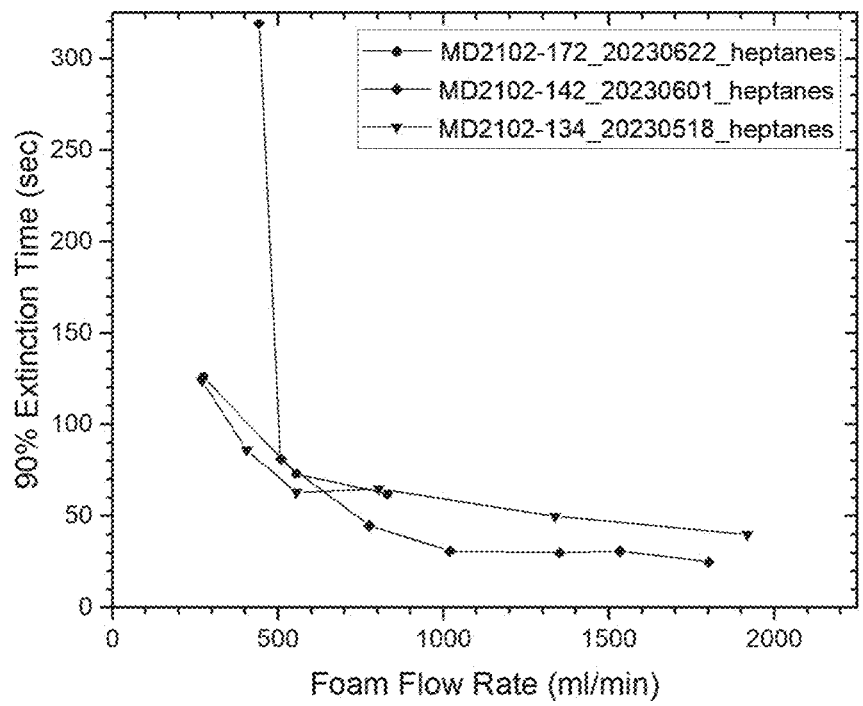

FIGS. 17A-B show heptane fire performances of extinction time vs foam flow rate listed in Table 1 (FIG. 17A) and 90% extinction time vs foam flow rate (FIG. 17B).

Figure 18:
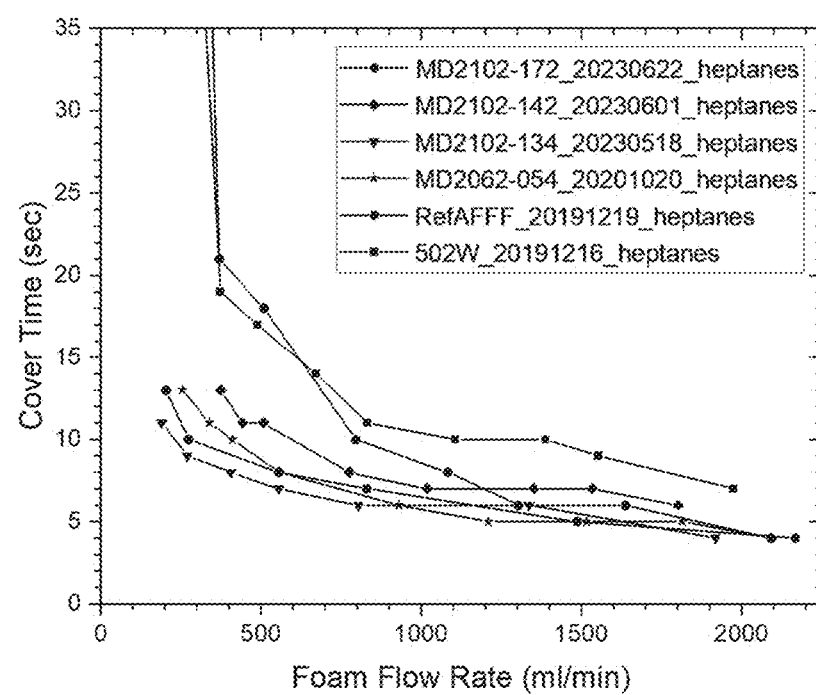

FIG. 18 shows heptane pool-fire coverage time vs foam flow rate for formulations listed in Table 1.

DETAILED DESCRIPTION

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are fluorine-free surfactant formulations to generate foams that have high fire suppression comparable to that of the firefighting foam used currently, worldwide, Aqueous Film Forming Foam (AFFF), which contains fluorocarbon surfactants with significant environmental impact. The formulations include custom synthesized tetrasiloxane-triazolediglucoside (MD2102-134), trisiloxane-triazolecarbonyldiglucoside (MD2102-172), and tetrasiloxane-triazolecarbonyldiglucoside (MD2101-142) surfactants that exhibit synergism with alkylglycoside surfactants and result in high fire suppression for gasoline and jet fuel fires. The 3% concentrate of the surfactant solutions have low viscosity and are suitable as candidates for drop-in replacement for AFFFs unlike many commercial fluorine-free formulations. As an example, a surfactant formulation composed of trisiloxane-triazolediglucoside (MD2102-134)) and alkyl polyglucoside surfactants and other components is shown to spread extremely quickly, suppress the fuel vapors, and extinguish a gasoline and jet fuel pool fires closer to the values measured for AFFF. Described herein are MD2102-134, MD2102-172, and MD2102-142 surfactant structural features, synthesis routes, formulation compositions' effect on the foam's resistance to the fuel vapors emerging from the pool surface that correlate with fire suppression effectiveness. The structural features include a range of head and tail dimensions. Compositions include the range of relative amounts of siloxane to hydrocarbon surfactants to achieve synergistic extinction and increased foam spreading on the pool surface. Fuel vapor resistance is quantified by the ranges of fuel/heat induced foam degradation and fuel vapor permeation rate relative to AFFF. Surface and near zero interfacial tensions show tendency for emulsification with fuel that might have led to surface cooling and lowering of fuel vapor pressure, which might have helped to quickly suppress small flamelets that tend to prolong complete fire extinction.

Disclosed herein are three non-ionic tetrasiloxane and trisiloxane surfactants that have comparable fire suppression to the zwitterionic-siloxane formulation (US Patent Publication No. US2022/11420083 B2, Pub. Date Aug. 23, 2022). The non-ionic surfactants are less susceptible to ions in sea water, which may be used for firefighting on ships. The foams generated from the non-ionic siloxane formulations were found to spread quickly on a burning gasoline pool surface similar to the prior zwitterionic-siloxane formulation. The present formulation contains a glycoside and a solvent along with nonionic-tetrasiloxane or trisiloxane surfactants. The superior fire suppression effectiveness is due to increased oleophobicity of the tail that blocks the fuel vapor permeation through foam covering the pool surface while maintaining amphiphilicity with a non-ionic head group. Also significant is the synergistic interaction with hydrocarbon co-surfactant, where the fire extinction times are smaller for the combination of the surfactants compared to those for the two surfactants individually. The synergism blocks the fuel permeation and contributes to faster extinction without using excess solution. The present formulation also has low viscosity for the 3% concentrate, which makes it suitable as a drop-in replacement to AFFF unlike many commercial fluorine-free foams.

The present formulations include compound 1. Compound 1 has two isomers varying in where the carbon atom bonds to the triazole ring, at either the 4 (1a) or 5 (1b) position. Three specific compounds, which may include both isomers, are MD2102-134 (tetrasiloxane-triazolediglucoside 9), MD2102-172 (trisiloxane-triazolecarbonyldiglucoside, 10), and MD2102-142 (tetrasiloxane-triazolecarbonyldiglucoside 11). The syntheses of these compounds are described herein and may be generalized to any polysaccharide 2, azidoalkyltris(trimethylsiloxy) silane, or azidoalkylbis(trimethylsiloxy)methylsilane.

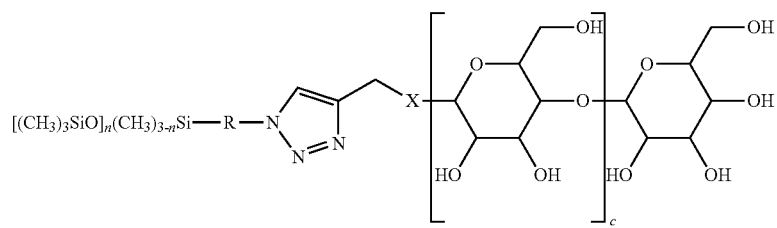
1a
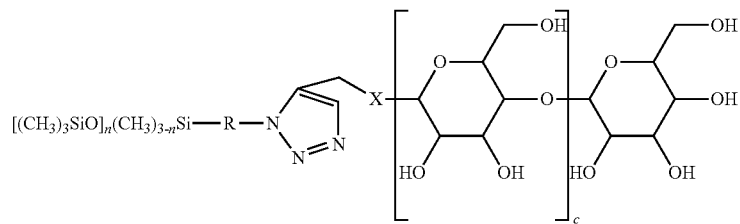
1b
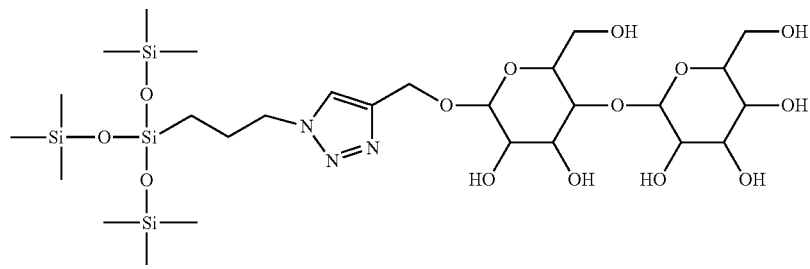
9
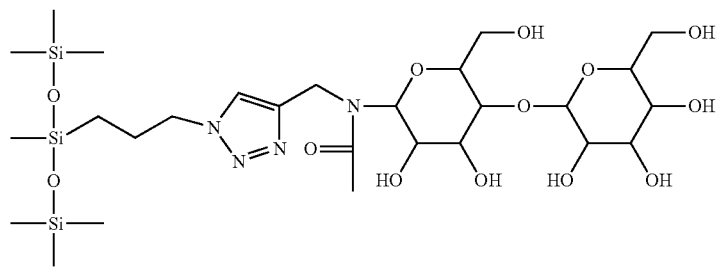
10
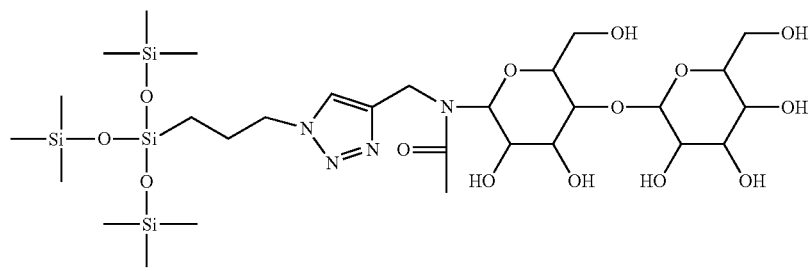
11

A fire-fighting formulation is made by combining 1 with poly(glucoside)-alkane 12, optionally poly(ethylene glycol) monoalkyl ether 13, and water. In 12, n is an integer from 1 to 20 and x is a positive integer. In 13, z and p are positive integers. A foam is made by mixing the formulation with air, and the foam may be applied to a fire to extinguish it. Though not limited to such amounts, example percentages of the ingredients are disclosed herein, and the formulation may be made with any amounts that result in a fire-fighting foam.

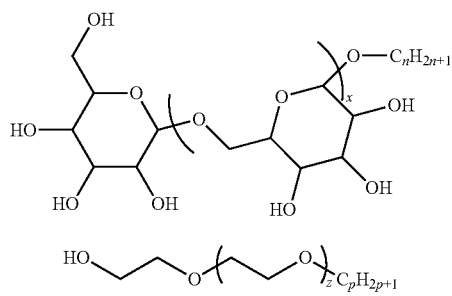

When a member of each surfactant class 1 and 12 with certain characteristics is combined in a foam generating formulation, the foam produced displays an effective fire suppression capability. It may or may not also include a diethyleneglycol butylether (DGBE) solvent 13 where parameters p and z are greater than or equal to 1. Table 1 shows an example formulation. The ratio of the siloxane to glycoside surfactants may range from 0.03 to 5.

TABLE 1

Fluorine-free and RefAFFF formulations

| Siloxane-triazoleglucoside (MD2102-134, MD2102-142, or MD2102-172) | Zwitterionic tetrasiloxanebetaine (MD2062-54)) formulation[1] | Nonionic trisiloxane-polyoxyethylene 502W formulation[2] | RefAFFF formulation[3] |
|---|---|---|---|
| 0.28 to 0.15% Siloxane-triazoleglucoside | 0.065% Zwitterionic tetrasiloxane surfactant e.g., tetrasiloxane-sulfobetaine | 0.2% Trisiloxane surfactant, Dowsil 502W additive | 0.3% Capstone 1157 |
| 0.42 to 0.22% Hydrocarbon surfactant, e.g., Glucopon225DK | 0.3% Hydrocarbon surfactant, e.g., Glucopon225DK | 0.3% Hydrocarbon surfactant, Glucopon225DK | 0.2% Glucopon215 CS UP |
| 0.5% solvent, e.g., DGBE | 0.5% solvent, e.g., DGBE | 0.5% solvent, DGBE | 0.5% DGBE |
| 99% Distilled water | 99.135% Distilled water | 99% Distilled water | 99% Distilled water |

[1]U.S. Pat. No. 11,420,083 (Aug. 23, 2022)
[2]U.S. Pat. No. 11,117,008 (Sep. 14, 2021), Colloids and Surfaces A, 579, 123686, 2019
[3]RefAFFF passed the 28 ft² US Mil-F-24385F fire test with an extinction time of 26 s, burnback time of 562 s, 25% liquid drainage time of 317 s, foam expansion ratio of 7.5 (Journal of Surfactants and Detergents, 21, 711-722, 2018)

These materials advance the development of non-ionic formulations of fluorine-free surfactants for generation of foams with fuel vapor blocking property and fire suppression activity that approaches the fire extinction performance level of fluorocarbon surfactant containing AFFF formulations for gasoline fires. Both the two-step synthesis of the siloxane-triazoleglucoside surfactants and fire suppression performance using the formulations show comparable performance with AFFF. Furthermore, trisiloxane-triazolecarbonyldiglucoside (MD2102-172) has a foam degradation rate comparable to that of AFFF when the foam is placed on warm gasoline unlike many fluorine-free foams. Previously, a similar result for zwitterionic tetrasiloxane-sulfobetaine was reported. The sulfobetaine head tends to self-destruct the tetrasiloxane tail ("Sulfobetaine-siloxanes: A class of self-destructive surfactants", *Journal of Surfactants and Detergents*, Submitted) unlike the present non-ionic surfactant formulations. Also, the non-ionic formulations are less susceptible to interference from ions present in salt water applications on ship board firefighting. Previously, a similar result for heptane fires was reported using a formulation containing a commercially available siloxane surfactant. But, the gasoline fires are significantly more difficult to suppress than the heptane fires partly due to gasoline's higher volatility and ability to extract surfactant from the foams causing bubble coalescence and higher fuel transport through a foam layer covering the pool surface. The 3% concentrate of the current invention is a potential drop-in replacement for AFFF. Very few commercial foams have low viscosity for a 3% concentrate unlike the present formulation and therefore most commercial formulations would require very expensive hardware modifications and are not suitable drop-in replacements for AFFF. The fluorine-free feature is critical for environmental regulation compliance. A methodology is developed where the fuel resistance property measurements are used as metrics to quantitatively rank numerous commercial formulations that enable identification of superior performing fluorine-free surfactant relative to AFFF. In addition, near zero interfacial tension of the siloxane-triazolediglucoside formulations may enable formation of fine emulsion containing small aqueous droplets at the fuel pool surface and induce more effective cooling of the hot pool reducing vapor pressure. This could also explain the observation of reduced edge flame (small flamelets) with the present formulations unlike the nonionic trisiloxane 502W formulation.

Figure 1:
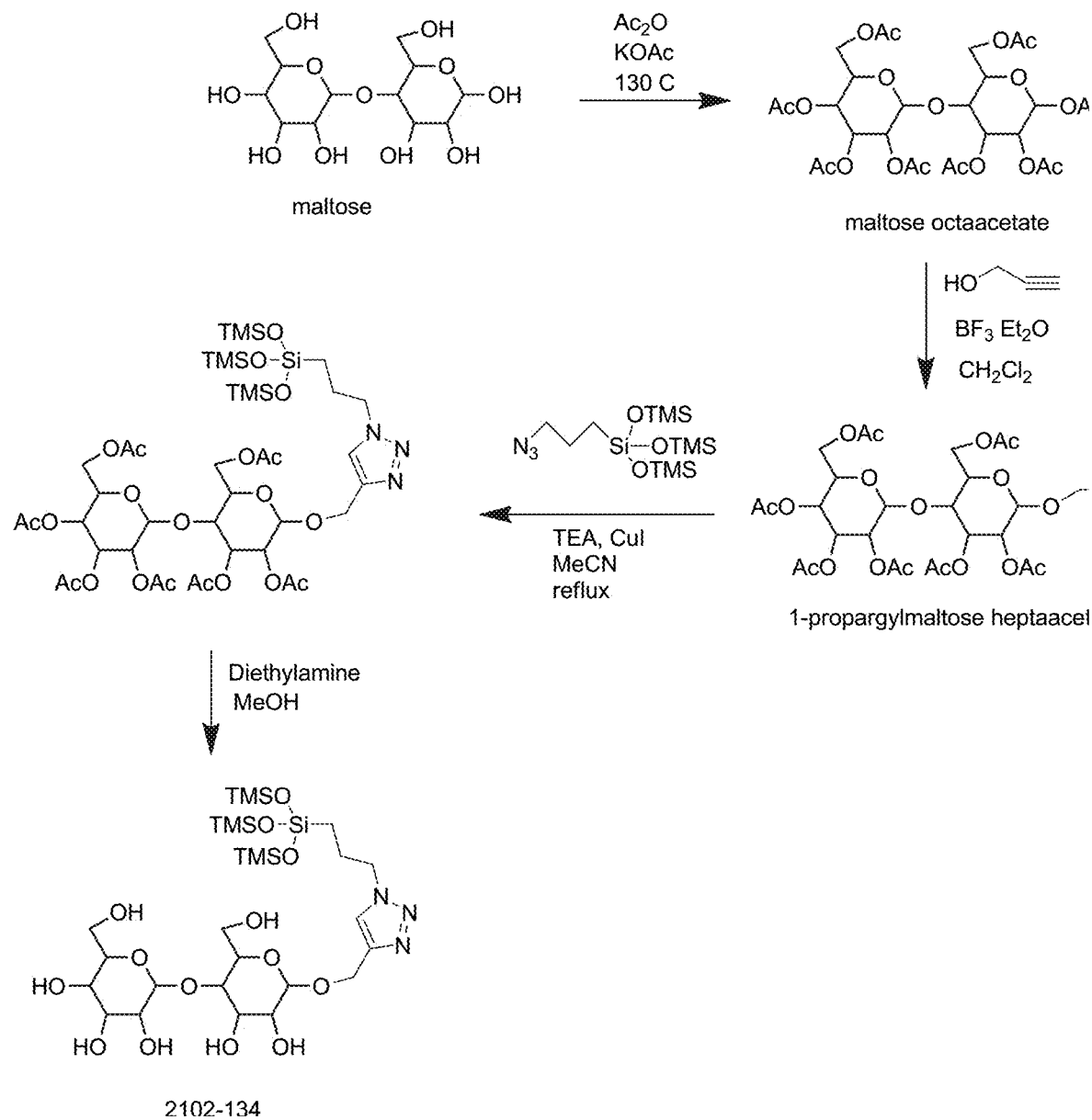
FIG. 1 shows a chemical synthesis of tetrasiloxane-triazolediglucoside surfactant (MD2102-134).
Figure 2:
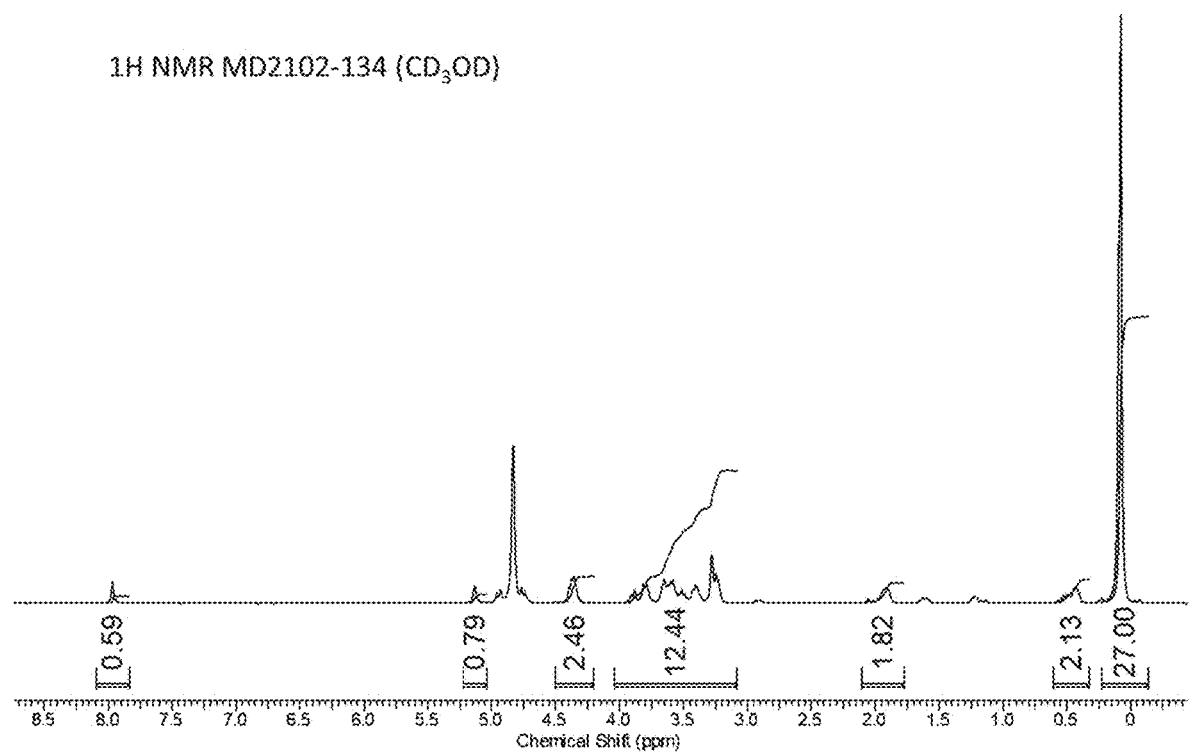
FIG. 2 shows $H^1$ NMR spectra for tetrasiloxane-triazole-diglucoside.

Siloxane-triazoleglucoside surfactant synthesis—The synthesis of MD2102-134 is shown in FIG. 1. The synthesis begins by complete acetylation of maltose by heating in a mixture of acetic anhydride using potassium acetate as the base. In this way, maltose octaacetate was prepared in good yield. Next, propargyl alcohol was reacted with the maltose octaacetate catalyzed by boron trifluoride diethyl etherate in dichloromethane solvent to give the glycosylation product 1-propargylmaltose heptaacetate. In the next step, the [3+2] cycloaddition reaction between 3-azidopropyltris(trimethylsiloxy)silane and 1-propargylmaltose heptaacetate was carried out by refluxing equimolar quantities in acetonitrile solvent in the presence of the catalysts triethylamine and copper (I) iodide. The product from the cycloaddition reaction was a 1,4-substituted-1,2,3-triazole linking the tetrasiloxane with the protected maltose. In the last step, the acetyl protecting groups on the maltose sugar were deprotected by reaction with excess diethylamine in methanol solvent. After evaporation of the solvent, the product from the last step in the synthesis was the surfactant MD2102-134. The NMR of MD2012-134 dissolved in methanol-$d_4$ are shown in the FIGS. 2-4. The proton NMR spectrum shows the 1,2,3-triazole ring proton at 8.0 ppm and the maltose ring protons from 5.1-3.0 ppm. The methylene group ($CH_2$) bonded to silicon resonates at 0.5 ppm and the tris(trimethylsiloxy) group shows a strong signal at 0.1 ppm. The carbon-13 spectrum shows that all of the acetate protecting groups that would have resonated at ~170 ppm were no longer present. The carbon-13 spectrum also shows the 1,2,3-triazole ring carbons resonating at 144 and 124 ppm. The silicon-29 spectrum shows the trimethylsilyl groups ($Me_3Si$—) with a chemical shift of +8 ppm while the silicon atom bonded to the propane chain ($CH_2SiO_3$) had a chemical shift of −66 ppm.

The synthesis of MD2102-142 is shown in FIG. 5. In the first step, maltose was reacted with excess propargylamine at 50° C. to produce the 1-deoxy-1-propargylaminomaltose. Next, the 1-deoxy-1-propargylaminomaltose was reacted with acetic anhydride in methanol solvent to give the product N-acetyl-1-deoxy-1-propargylaminomaltose. In the last step, the [3+2]cycloaddition reaction between 3-azidopropyltris(trimethylsiloxy)silane and N-acetyl-1-deoxy-1-propargylaminomaltose was carried out by refluxing equimolar quantities in methanol solvent in the presence of the catalysts triethylamine and copper (I) iodide. The product from the last reaction step was the surfactant MD2102-142 which incorporated a 1,2,3-triazole linking the tetrasiloxane to the 1-deoxy-1-aminomaltose sugar. The NMR of MD2012-142 dissolved in methanol-$d_4$ are shown in the FIGS. 6-7. The proton NMR spectrum shows the 1,2,3-triazole ring proton resonating at 7.8 ppm. The two singlets at 2.25 and 2.2 ppm are the methyl group of the acetyl substituent, which are two peaks owing to restricted rotation about the amide bond. The tris(trimethylsilyl) group shows a strong singlet at 0.1 ppm. The carbon-13 spectrum shows the carbonyl signal at 172 ppm and the trimethylsiloxy groups as a strong singlet at 0.6 ppm.

The synthesis of MD2102-172 is shown in FIG. 8. The synthesis started from the intermediate N-acetyl-1-deoxy-1-propargylaminomaltose that had already been made in the synthesis of MD2102-142. Thus, equimolar amounts of N-acetyl-1-deoxy-1-propargylaminomaltose and 3-azidopropylbis(trimethylsiloxy)methylsilane were reacted in a [3+2]cycloaddition reaction using methanol as solvent and triethylamine and copper (I) iodide as catalysts. The product from the reaction was the surfactant MD2102-172 which incorporated a 1,2,3-triazole linking the trisiloxane to the 1-deoxy-1-aminomaltose sugar. The NMR of MD2012-172 dissolved in methanol-$d_4$ and DMSO-$d_6$ are shown in the FIGS. 9-10. The proton NMR spectrum shows the 1,2,3-triazole ring protons at 7.8 and 8.0 ppm, indicating there was a mixture of both 1,4- and 1,5-isomers. The maltose ring protons were found from 5.7-3.0 ppm. The two singlets at 2.1 and 1.9 ppm are the methyl group of the acetyl substituent, which are two peaks owing to restricted rotation about the amide bond. The two trimethylsiloxy groups were a singlet at 0.0 ppm and the other methyl group bonded to silicon resonated at −0.5 ppm. The carbon-13 spectrum shows the carbonyl signals at ~172 ppm and the trimethylsiloxy groups as a strong singlet at 0.67 ppm and the other carbon attached to silicon at −1.47 ppm.

Measurements of surfactant properties—The surface and interfacial tensions as well as times for complete degradation of foams placed on alcohol-free gasoline at 37° C. and heptane at 60° C. are shown in Table 2. The surface and interfacial tensions are measured using DuNoy ring method. Methods used for foam degradation were described in detail in *Colloids and Surfaces A*, 579, 123686, 2019.

TABLE 2

Properties of siloxane-triazoleglucoside formulations from Table 1, column 1

|  | MD2102-134Form | MD2102-172Form | MD2102-142Form |
|---|---|---|---|
| Surface tension (mN/m) | 20.6 | 21.2 | 21.2 |
| Interfacial tension heptane (mN/m) | 0.99 | 0.70 | 1.24 |
| Interfacial tension gasoline (mN/m) | 0.25 | 0.26 | 0.28 |

TABLE 2-continued

Properties of siloxane-triazoleglucoside formulations from Table 1, column 1

|  | MD2102-134Form | MD2102-172Form | MD2102-142Form |
|---|---|---|---|
| Foam lifetime gasoline at 37° C. (min) | 46 ± 6 | 130 | 20 ± 1 |
| Foam lifetime heptane at 60° C. (min) | 13.8 ± 1 | 17 ± 4 | 4 ± 1 |
| EDC value (heptane, $cm^2/s$) | $4.7 \times 10^{-4} \pm 2.0 \times 10^{-4}$ | $2.0 \times 10^{-2} \pm 0.1 \times 10^{-2}$ | $4.9 \times 10^{-4} \pm 4.0 \times 10^{-4}$ |

Critical micelle concentrations (CMC) are measured from surface tension versus surfactant concentration in solution for individual siloxane-triazoleglucoside surfactants and for mixtures with alkylpolyglucoside shown in column 1 of Table 1. Two lines are fitted for each curve and CMC is determined as the value at the intersection of the two lines. The equations for the lines are displayed in FIG. 11. The CMC values are displayed in Table 3.

TABLE 3

CMC values for individual siloxane surfactants and siloxane formulations (column 1, table 1)

|  | Individual surfactant CMC (wt %) | 2:3 Siloxane (Table 1) surfactant: Glucopon225DK Mixture CMC (wt %) |
|---|---|---|
| MD2102-134 | 0.094 | 0.08-0.12 |
| MD2102-142 | 0.031 | 0.064 |
| MD2102-172 | 0.065 | 0.083 |

MD2102-134 surfactant on its own formed an opaque suspended solution that did not foam well, turned more clear upon G225 and DGBE addition. -142 went easily into solution with some stirring, formed slightly hazy brown solution that foamed okay. -172 surfactant on its own formed an opaque suspension that foamed well, solution turned clear upon G225 and DGBE addition. The -134:G225 mixture CMC profile had a very small sloped region making CMC determination challenging. The use of one point in the sloped versus linear region and vice versa produced a possible CMC range between 0.08 and 0.12 wt %. The higher end was chosen for the 6×CMC calculation wanting to have more surfactant than less, just in case. Surfactants were evaluated in the following formulations: 0.28% MD2102-134, 0.42% G225, 0.5% DGBE; 0.15% MD2102-142, 0.225% G225, 0.5% DGBE; and 0.2% MD2102-172, 0.3% G225, 0.5% DGBE.

A 4-cm thick foam layer placed on hot (60° C.) heptane pool degrades as the heptane vapor permeates through the foam. The change in foam layer thickness with time is shown in FIG. 12. It shows that MD2102-172Form has slower degradation than MD2102-134 and MD2102-142. FIG. 13 shows similar results when the 4-cm thick foam layer was placed on a warm gasoline pool. Indeed, MD2102-172 shows degradation rate similar to AFFF.

FIG. 14 shows heptane vapor permeation through the foam layer with time for a 4-cm (initial thickness) thick foam layer placed on hot (60° C.) heptane pool. Heptane concentration above the foam surface is measured using FTIR method as described in *Colloids and Surfaces A*, 522, 1-17, 2017. Heptane fuel flux for the 3 foam formulations are shown. All 3 showed poor foam stability over heptane specifically, leading to rapid holes in the foam layer and quick flux profiles. However, at short time scales, it can clearly be seen that all 3 block heptane fuel vapors well. No quantifiable differences in flux are noted from the profiles other than MD2102-172 seems to be more stable on heptane and produced a longer flux profile, but its early time profile is similar to MD2102-134 and -142 formulations.

Fuel transport was only collected for heptane. The raw fuel transport profiles in FIG. 14 were used with collected foam height data with time (collected during the fuel transport experiment) to derive an effective diffusion coefficient (EDC) by applying Fick's law. Fick's law was applied at any given time using the measured foam layer thickness instead of the initial foam layer thickness of 4-cm using a pseudo steady state approximation. The pseudo steady Fick's law model fitted to the fuel flux data are displayed in Table 2. The EDC values indicate the transport performance of the foams, independent of differences in foam degradation.

Foam generation and application for fire suppression—Foams can be generated using a device that mixes air and water at different ratios known as the expansion ratio (Ex, volume of foam/volume of liquid) and are described in *Colloids and Surfaces A*, 579, 123686, 2019. As an example, foams are generated by sparging air continuously at a constant rate through a porous disc while feeding solution continuously to maintain a constant liquid column height (3-cm) above the porous disc (25-50 µm pores, 1.9-cm diameter) by using a leveling system. Foam collects to form 5.5-cm thick layer above the solution surface while flowing out from a 2.5-cm diameter outlet tube connected to the cap of a 0.7-liter plastic bottle (7.6-cm diameter, 15.9-cm height). Foam flow rate is maintained constant during fire extinction and are measured by recording time taken to collect 500 mL volume before and after fire extinction. Foam expansion ratio (volume of foam/weight of foam) is also measured before and after each fire extinction experiment in order to calculate liquid flow rate (foam flow rate/expansion ratio). To apply the foam continuously on to burning fuel pool, the outlet tube from the foam generating plastic bottle is placed about 1-inch above the pool surface. The foam is applied directly at the near-edge of a burning gasoline (alcohol-free) pool (circular shape) and allowed to spread across the pool to cover it and until fire extinction, or a maximum time of 5 minutes if there is no extinction. Extinction experiments are conducted at different values of liquid (or foam) flow rates. The gasoline pool is allowed to burn for 60 s (preburn time) prior to the foam application. The pool consisted of 1-cm thick fuel layer above a 5-cm thick water layer. The fuel level is maintained at 1-cm below the rim of the 19-cm diameter crystallizing dish to accommodate the foam and prevent overflow of the fuel by using a leveling system. The apparatus used for generating the foams and conducting fire extinction were developed previously by us [*Journal of Surfactants and Detergents*, 21, 711-722, 2018].

Gasoline fire extinction can be conducted by applying the foams from the foam generating device on to a burning liquid fuel pool at different application rates. Examples of such testing results are depicted in FIG. 15A where the extinction time is measured as a function of measured foam flow rates. For comparison, extinction results for the nonionic trisiloxane and Ref AFFF formulations listed in Table 1 are shown in FIG. 15A. FIG. 15A demonstrates that the three nonionic siloxane-triazoleglucoside formulations shown in column 1 of Table 1 have fire suppression profiles comparable to the zwitterionic siloxane formulation (MD2062-54Form) and are significant improvements over the trisiloxane-polyoxyethylene-502W formulation and are close the extinction profile of RefAFFF. The extinction times for the non-ionic siloxane-triazole formulation are about 1.6 times that of RefAFFF. The MilSpec solution application rate of 2 gallons per minute for a 28 ft² gasoline fire corresponds to 2.9 kg/min/m², which corresponds to a solution flow rate of 82 mL/min and foam flow rate of 650 mL/min for the 19-cm diameter bench scale data shown in FIG. 15A. FIG. 15B shows 90% fire extinction profile for the three formulations listed in Table 1. The extinction time data were collected when 90% of the pool area was extinguished but small edge flames linger before complete fire extinction. The 90% extinction times are much closer to the complete extinction times displayed in FIG. 15A because of reduced "edgeflames". Edgeflames are small flamelets that linger on the pool surface and prolong complete fire extinction despite fire being extinguished on most of the pool surface.

FIGS. 16A-B show foam coverage times of burning gasoline pool versus foam application rate for the present formulations and foam expansion ratio, which is the ratio of foam volume to liquid volume contained in the foam. The coverage times for the formulations shown in column 1 of Table 1 are comparable to the zwitterionic siloxane formulation (MD2062-054) and are quicker than RefAFFF and siloxane-polyoxyethylene502W formulation especially at low foam flow rates as shown in FIG. 16A. The foam expansion ratios for the formulations of this invention are slightly drier than the zwitterionic siloxane formulation as shown in FIG. 16B.

It is important to note that the fire suppression depends on fuel. It was shown previously that fluorine-free foams' fire suppression is affected by the type of fuel (gasoline versus heptane) more than AFFFs (NRL Memorandum Report NRL/MR/6123-19-9895). Synergism between two families of surfactants also depends on the fuel. FIGS. 17A-B and 18 show results for heptane fire. FIG. 17A shows that only MD2102-134 has extinction time profile comparable to the zwitterionic-siloxane formulation (MD2062-54). But both have extinction profiles inferior to the siloxane-polyoxyethylene502W formulation and the RefAFFF. FIG. 17B shows times for 90% extinction are comparable for both MD2102-134 and MD2102-172, while MD2102-142 deviates especially at low foam flow rates.

FIG. 18 shows coverage times for a heptane pool fire for all three present siloxane formulations are comparable to the zwitterionic-siloxane formulation (MD2062-54) and are quicker than the siloxane-polyoxyethylene502W formulation and RefAFFF.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A compound having the formula:

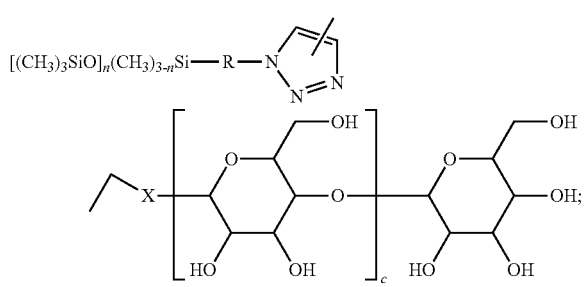

wherein n is 2 or 3;

wherein R is a C3-C9 alkylene group;

wherein X is —O— or —N(COCH$_3$)—; and wherein c is a positive integer.

2. The compound of claim 1, wherein the compound is

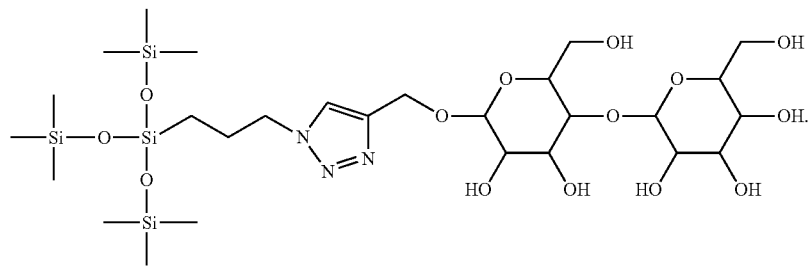 [SMILES: C[Si](C)(C)O[Si](CCCn1cc(COC2OC(CO)C(OC3OC(CO)C(O)C(O)C3O)C(O)C2O)nn1)(O[Si](C)(C)C)O[Si](C)(C)C]

3. The compound of claim 1, wherein the compound is

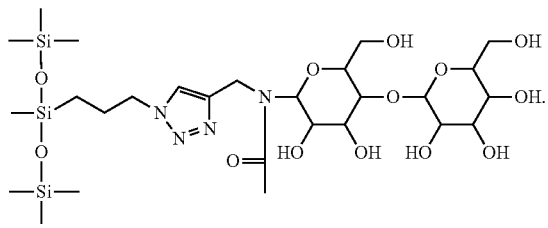 [SMILES: CC(=O)CN(Cc1cn(CCC[Si](C)(O[Si](C)(C)C)O[Si](C)(C)C)nn1)C1OC(CO)C(OC2OC(CO)C(O)C(O)C2O)C(O)C1O]

4. The compound of claim 1, wherein the compound is

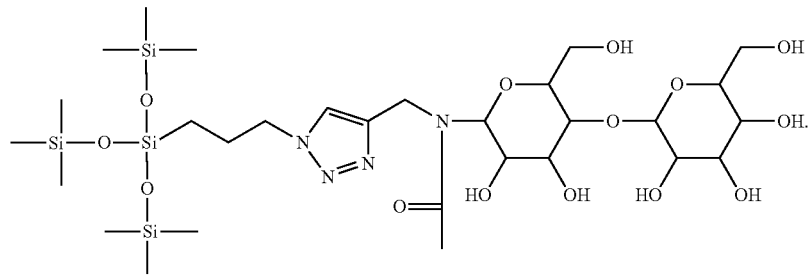 [SMILES: CC(=O)CN(Cc1cn(CCC[Si](O[Si](C)(C)C)(O[Si](C)(C)C)O[Si](C)(C)C)nn1)C1OC(CO)C(OC2OC(CO)C(O)C(O)C2O)C(O)C1O]

5. A composition comprising:
the compound of claim 1;
a poly(glucoside)-alkane having the formula:

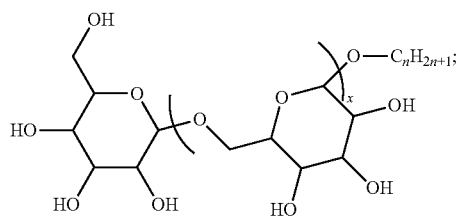

wherein n is an integer from 1 to 20; and
wherein x is a positive integer; and
water.

6. The composition of claim 5, further comprising:
a poly(ethylene glycol) monoalkyl ether having the formula:

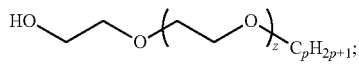

wherein z is a positive integer; and
wherein p is a positive integer.

7. A method comprising:
mixing the composition of claim 5 with air to form a foam.

8. The method of claim 7, further comprising:
applying the foam to a fire.

9. The method of claim 7, further comprising:
applying the foam to a fire in an amount sufficient to extinguish the fire.

10. A method comprising:
providing a polysaccharide having the formula:

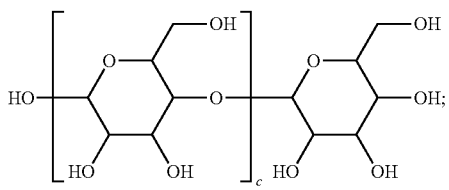

wherein c is a positive integer;
reacting the polysaccharide with acetic anhydride to form acetate groups, forming a polysaccharide acetate having the formula:

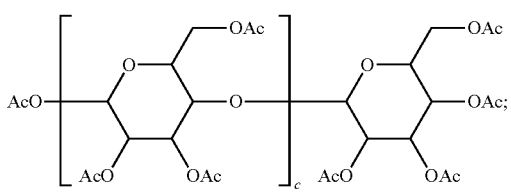

reacting the polysaccharide acetate with propargyl alcohol to form a propargyl compound having the formula:

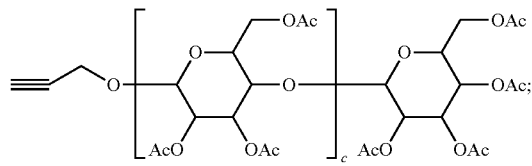

and
reacting the propargyl compound with an azidoalkyltris(trimethylsiloxy)silane or an azidoalkylbis(trimethylsiloxy)methylsilane to form a compound having the formula:

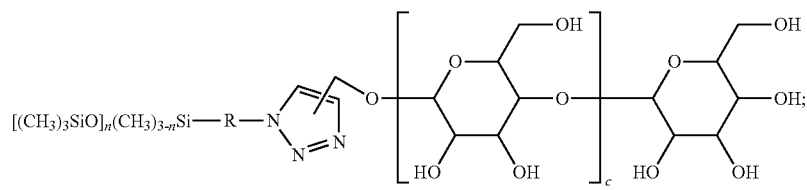

wherein n is 2 or 3; and wherein R is a C3-C9 alkylene group.

11. The method of claim 10, wherein the polysaccharide is maltose.

12. The method of claim 10, wherein the azidoalkyltris(trimethylsiloxy)silane is 3-azidopropyltris(trimethylsiloxy)silane.

13. The method of claim 10, wherein the azidoalkylbis(trimethylsiloxy)methylsilane is 3-azidopropylbis(trimethylsiloxy)methylsilane.

14. A method comprising:
providing a polysaccharide having the formula:

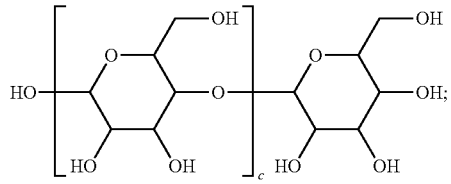

wherein c is a positive integer;
reacting the polysaccharide with propargylamine to form a propargyl compound having the formula:

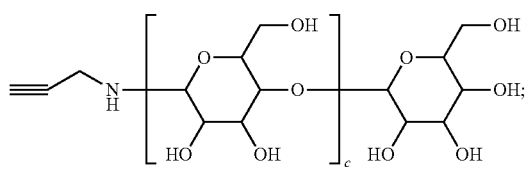

reacting the propargyl compound with acetic anhydride to form acetate groups, forming a polysaccharide acetate having the formula:

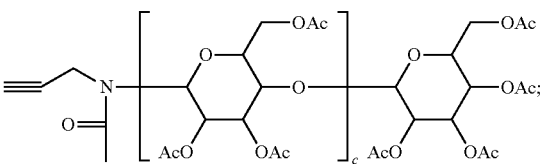

and
reacting the polysaccharide acetate with an azidoalkyltris(trimethylsiloxy)silane or an azidoalkylbis(trimethylsiloxy)methylsilane to form a compound having the formula:

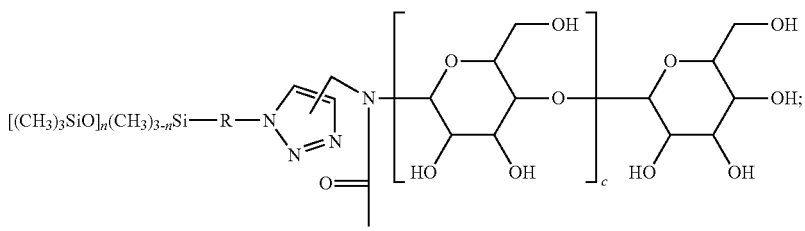

wherein n is 2 or 3; and
wherein R is a C3-C9 alkylene group.

15. The method of claim 14, wherein the polysaccharide is maltose.

16. The method of claim 14, wherein the azidoalkyltris(trimethylsiloxy)silane is 3-azidopropyltris(trimethylsiloxy)silane.

17. The method of claim 14, wherein the azidoalkylbis(trimethylsiloxy)methylsilane is 3-azidopropylbis(trimethylsiloxy)methylsilane.

* * * * *